US008294740B2

(12) United States Patent
Aragaki et al.

(10) Patent No.: US 8,294,740 B2
(45) Date of Patent: Oct. 23, 2012

(54) IMAGE PROCESSOR, IMAGE DISPLAY DEVICE, IMAGE PROCESSING METHOD, IMAGE DISPLAY METHOD, AND PROGRAM

(75) Inventors: Takumi Aragaki, Matsumoto (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 638 days.

(21) Appl. No.: 12/509,796

(22) Filed: Jul. 27, 2009

(65) Prior Publication Data
US 2010/0033405 A1 Feb. 11, 2010

(30) Foreign Application Priority Data
Aug. 5, 2008 (JP) ................................ 2008-201563

(51) Int. Cl.
*G09G 5/02* (2006.01)

(52) U.S. Cl. .......... 345/694; 345/613; 345/647; 345/55; 359/443; 349/5

(58) Field of Classification Search .......... 359/443–461; 345/611–616, 647–649, 660, 672–674, 694, 345/696, 1.1–1.3, 55–56; 349/5
See application file for complete search history.

(56) References Cited

U.S. PATENT DOCUMENTS

| 5,434,595 | A   | * | 7/1995  | Macaulay ................... 345/207 |
| 5,847,784 | A   | * | 12/1998 | Finnila et al. ................ 349/73 |
| 6,219,011 | B1  | * | 4/2001  | Aloni et al. ................. 345/1.3 |
| 6,525,772 | B2  | * | 2/2003  | Johnson et al. ............. 348/383 |
| 6,819,333 | B1  | * | 11/2004 | Sadowski ..................... 345/647 |
| 7,945,091 | B2  | * | 5/2011  | Utsugi et al. ................ 382/162 |
| 2006/0158545 | A1 | * | 7/2006  | Hirai ....................... 348/333.01 |
| 2008/0094419 | A1 | * | 4/2008  | Leigh et al. ................. 345/660 |

FOREIGN PATENT DOCUMENTS
JP        A-61-150487        7/1986

* cited by examiner

*Primary Examiner* — Lun-Yi Lao
*Assistant Examiner* — Gregory J Tryder
(74) *Attorney, Agent, or Firm* — Oliff & Berridge, PLC

(57) ABSTRACT

An image processor that corrects image signals corresponding to sub-pixels which form one pixel, includes: a shift amount storage section that stores shift amounts of display positions of display sub-pixels corresponding to the sub-pixels which form a display pixel using a predetermined reference position within a display image as a reference position; a frequency analysis section that analyzes a spatial frequency of an input image and outputs an analysis result; and an image signal correcting section that performs correction processing of image signals corresponding to the sub-pixels, which form each pixel of the input image, on the basis of the analysis result and the shift amounts, wherein the image signal correcting section performs different correction processing according to the spatial frequency.

12 Claims, 26 Drawing Sheets

| PSWCH | PSWCV | SHIFT AMOUNT |
|---|---|---|
| 0 | 0 | (dx,dy) |
| 0 | 1 | (dx,0) |
| 1 | 0 | (0,dy) |
| 1 | 1 | (0,0) |

FIG. 19

IMAGE PROCESSOR, IMAGE DISPLAY DEVICE, IMAGE PROCESSING METHOD, IMAGE DISPLAY METHOD, AND PROGRAM

BACKGROUND

1. Technical Field

The present invention relates to an image processor, an image display device, an image processing method, an image display method, and a program.

2. Related Art

In recent years, high-performance image display devices, such as big-screen televisions or projectors, have come into wide use. In these image display devices, it is further important to improve the quality of a display image. Particularly for projectors as image display devices with high degree of freedom of installation, a demand for higher quality of a display image is becoming strong as the quality of the contents itself becomes high.

As an example of such a projector, a projector in which a transmissive matrix type liquid crystal display device is used as a light valve is disclosed in JP-A-61-150487. The projector includes a plurality of dichroic mirrors, divides light from a light source into three primary colors of R, G, and B by a plurality of dichroic mirrors, and makes each light transmitted through a liquid crystal display device and then projected onto a screen through a projection lens. At this time, the transmitted light of the liquid crystal display device is mixed by an optical unit, such as a mirror, such that two-dimensional pixel arrangements match each other.

In this kind of projector, the quality of a display image can be improved by performing image display by increasing the number of pixels of a matrix type liquid crystal display device so that light modulation based on an image signal corresponding to contents is performed, for example.

However, display positions of display sub-pixels corresponding to sub-pixels which form one pixel are shifted on a screen due to a chromatic aberration of an optical system of the projector, adjustment accuracy of a position adjustment unit for constituent components of the optical system, and the like. Accordingly, lowering of a sense of resolution or generation of a false color occurs, for example, in an edge portion or endmost portion of a display image on the screen, which causes deterioration of the quality of the display image. The shift amounts of display positions of the display sub-pixels corresponding to sub-pixels were negligible when the number of display pixels was small. However, as the number of display pixels is increased, shift of the display positions becomes noticeable. In the coming years, deterioration of the image quality caused by shift of display positions of display sub-pixels on a screen tends to occur easily.

Therefore, in order to prevent the deterioration of the image quality, it is considered to correct image signals corresponding to sub-pixels and to display an image on the basis of the corrected image signals. However, a moiré may be generated on an image displayed by the corrected image signal depending on an input image, which may deteriorate the image quality on the contrary.

SUMMARY

An advantage of some aspects of the invention is that it provides an image processor, an image display device, an image processing method, an image display method, and a program capable of suppressing deterioration of the image quality of a display image resulting from shift of display positions of display sub-pixels corresponding to sub-pixels which form one pixel while suppressing generation of a moiré.

According to a first aspect of the invention, an image processor that corrects image signals corresponding to sub-pixels which form one pixel includes: a shift amount storage section that stores shift amounts of display positions of display sub-pixels corresponding to the sub-pixels which form a display pixel using a predetermined reference position within a display image as a reference position; a frequency analysis section that analyzes a spatial frequency of an input image and outputs an analysis result; and an image signal correcting section that performs correction processing of image signals corresponding to the sub-pixels, which form each pixel of the input image, on the basis of the analysis result and the shift amounts. The image signal correcting section performs different correction processing according to the spatial frequency.

In this case, since image signals corresponding to display sub-pixels which form a display pixel are corrected, generation of a false color in an endmost portion or near the edge of the display image or deterioration of a sense of resolution can be suppressed even if the display positions of the display sub-pixels are shifted from each other. In addition, since correction processing of an image signal is changed according to the spatial frequency of the input image, it is possible to avoid a situation where the image quality deteriorates on the contrary by correction of the image signal based on the shift amount. As a result, for example, an image in which generation of a moiré is suppressed can be displayed.

Furthermore, in the image processor according to the aspect of the invention, the image signal correcting section may omit the correction processing when the input image has a frequency component equal to or larger than a predetermined threshold value and may perform the correction processing when the input image does not have a frequency component equal to or larger than the threshold value.

In this case, a situation where the image quality deteriorates by correction of image signals based on shift amounts of the display positions of display sub-pixels which form a display pixel can be reliably avoided by simple control.

Furthermore, in the image processor according to the aspect of the invention, the correction processing of the image signal correcting section may be changed by changing the shift amount from the shift amount storage section on the basis of the analysis result of the frequency analysis section.

In this case, even if the image quality deteriorates by correction of image signals based on shift amounts of the display positions of display sub-pixels which form a display pixel, it is not necessary to exclude correction processing of normal image signals. Accordingly, an image in which generation of a moiré is suppressed can be displayed without a processing load applied.

Furthermore, in the image processor according to the aspect of the invention, the frequency analysis section may include a horizontal frequency analysis section that analyzes a horizontal spatial frequency of the input image, and the image signal correcting section may omit correction processing of image signals corresponding to sub-pixels aligned in a horizontal direction of the input image when a frequency component equal to or larger than a first threshold value in the horizontal direction of the input image is included and may perform correction processing of image signals corresponding to sub-pixels aligned in a horizontal direction of the input image when a frequency component equal to or larger than the first threshold value in the horizontal direction of the input image is not included.

In this case, since ON/OFF control of correction processing of a horizontal image signal can be performed, the image quality in the horizontal direction can be improved without affecting the image quality in the vertical direction.

Furthermore, in the image processor according to the aspect of the invention, the frequency analysis section may include a vertical frequency analysis section that analyzes a vertical spatial frequency of the input image, and the image signal correcting section may omit correction processing of image signals corresponding to sub-pixels aligned in a vertical direction of the input image when a frequency component equal to or larger than a second threshold value in the vertical direction of the input image is included and may perform correction processing of image signals corresponding to sub-pixels aligned in a vertical direction of the input image when a frequency component equal to or larger than the second threshold value in the vertical direction of the input image is not included.

In this case, since ON/OFF control of correction processing of a vertical image signal can be performed, the image quality in the vertical direction can be improved without affecting the image quality in the horizontal direction.

Furthermore, in the image processor according to the aspect of the invention, the image signal correcting section may omit, on condition that a frequency component equal to or larger than a predetermined threshold value is included in at least some of sub-pixels of a first color component which form each pixel of the input image, the correction processing for all sub-pixels of the first color component.

In this case, generation of a moiré of a display sub-pixel corresponding to a sub-pixel of the first color component can be suppressed.

Furthermore, in the image processor according to the aspect of the invention, the frequency analysis section may analyze a spatial frequency of each of a plurality of division images obtained by dividing the input image, and the image signal correcting section may omit correction processing based on the shift amount for image signals corresponding to sub-pixels which form each pixel within a division image having a frequency component equal to or larger than a predetermined threshold value and may perform correction processing based on the shift amount for image signals corresponding to sub-pixels which form each pixel within a division image not having a frequency component equal to or larger than the threshold value.

In this case, correction processing of an image signal of each division image is independently changed according to the analysis result of a spatial frequency of each division image obtained by dividing the input image. Accordingly, generation of a false color in an endmost portion or near the edge or deterioration of a sense of resolution can be suppressed in the other division images by making a control of suppressing a moiré only for a division image in which the moiré may be generated.

Furthermore, in the image processor according to the aspect of the invention, a shift amount calculating section that calculates a shift amount at a corresponding sub-pixel position on the basis of the shift amounts stored in the shift amount storage section may be further included, and the image signal correcting section may perform the correction processing on an image signal corresponding to the sub-pixel position on the basis of the shift amount calculated by the shift amount calculating section.

In this case, the storage capacity for shift amounts to be stored can be reduced.

In addition, according to another aspect of the invention, an image display device that performs image display on the basis of image signals corresponding to sub-pixels which form one pixel includes: the image processor described above; and an image display section that displays an image on the basis of image signals corresponding to the sub-pixels corrected by the image processor.

In this case, since image signals corresponding to display sub-pixels which form a display pixel are corrected, generation of a false color in an endmost portion or near the edge of the display image or deterioration of a sense of resolution can be suppressed even if the display positions of the display sub-pixels are shifted from each other. In addition, since correction processing of an image signal is changed according to the spatial frequency of the input image, it is possible to avoid a situation where the image quality deteriorates on the contrary by correction of the image signal based on the shift amount. As a result, for example, an image in which generation of a moiré is suppressed can be displayed.

In addition, according to still another aspect of the invention, an image display device that performs image display on the basis of image signals corresponding to sub-pixels which form one pixel includes: an image signal correcting section that corrects the image signals corresponding to the sub-pixels, on the basis of shift amounts of display sub-pixels corresponding to the sub-pixels which form a display pixel, according to a spatial frequency of an input image; and an image display section that displays an image on the basis of image signals of the sub-pixels corrected by the image signal correcting section. The image display section displays an image in which generation of a moiré is suppressed regardless of the spatial frequency.

In this case, since correction processing of an image signal is changed according to the spatial frequency of the input image, it is possible to avoid a situation where the image quality deteriorates on the contrary due to moiré generated by correction of the image signal based on the shift amount. As a result, the image quality can be improved.

In addition, according to still another aspect of the invention, an image processing method of correcting image signals corresponding to sub-pixels which form one pixel includes: acquiring an image signal corresponding to an input image; performing correction processing of image signals corresponding to the sub-pixels, which form each pixel of the input image, on the basis of shift amounts of display positions of display sub-pixels corresponding to the sub-pixels which form a display pixel; and analyzing a spatial frequency of the input image. In the performing of correction processing of image signals, different correction processing is performed according to the spatial frequency.

In this case, since image signals corresponding to display sub-pixels which form a display pixel are corrected, generation of a false color in an endmost portion or near the edge of the display image or deterioration of a sense of resolution can be suppressed even if the display positions of the display sub-pixels are shifted from each other. In addition, since correction processing of an image signal is changed according to the spatial frequency of the input image, it is possible to avoid a situation where the image quality deteriorates on the contrary by correction of the image signal based on the shift amount.

Furthermore, in the image processing method according to the aspect of the invention, in the performing of correction processing of image signals, the correction processing may be omitted when the input image has a frequency component equal to or larger than a predetermined threshold value and the correction processing may be performed when the input image does not have a frequency component equal to or larger than the predetermined threshold value.

In this case, a situation where the image quality deteriorates by correction of image signals based on shift amounts of the display positions of display sub-pixels which form a display pixel can be reliably avoided by simple control.

Furthermore, in the image processing method according to the aspect of the invention, the correction processing in the performing of correction processing of image signals may be changed by changing the shift amount on the basis of an analysis result in the analyzing of the spatial frequency.

In this case, even if the image quality deteriorates by correction of image signals based on shift amounts of the display positions of display sub-pixels which form a display pixel, it is not necessary to exclude correction processing of normal image signals. Accordingly, an image in which generation of a moiré is suppressed can be displayed without a processing load applied.

In addition, according to still another aspect of the invention, an image display method of performing image display on the basis of image signals corresponding to sub-pixels which form one pixel includes: acquiring an image signal corresponding to an input image; correcting image signals corresponding to the sub-pixels on the basis of shift amounts of display positions of display sub-pixels, which correspond to the sub-pixels which form a display pixel, according to a spatial frequency of the input image; and displaying an image on the basis of image signals of the sub-pixels corrected in the correcting of image signals. In the displaying of an image, an image in which generation of a moiré is suppressed regardless of the spatial frequency is displayed.

In this case, since correction processing of an image signal is changed according to the spatial frequency of the input image, it is possible to avoid a situation where the image quality deteriorates due to moiré generated by correction of the image signal based on the shift amount. As a result, the image quality can be improved.

BRIEF DESCRIPTION OF THE DRAWINGS

The invention will be described with reference to the accompanying drawings, wherein like numbers reference like elements.

FIG. 19 is a view for explaining a processing switching control signal in the second embodiment.

DESCRIPTION OF EXEMPLARY EMBODIMENTS

Hereinafter, embodiments of the invention will be described in detail with reference to the accompanying drawings. In addition, the embodiments described below are not intended to limit the contents of the invention defined by the appended claims. In addition, all of the configurations described below are not necessarily essential components of the invention.

Hereinafter, a projector is described as an example of an image display device of the invention. However, the image display device of the invention is not limited to the projector. That is, since it is thought that deterioration of the image quality resulting from shift of the display position of a display sub-pixel corresponding to a sub-pixel is a phenomenon which may occur not only in the projector but also in various image display devices, the image display device of the invention is not limited to the projector.

First Embodiment

Figure 1:
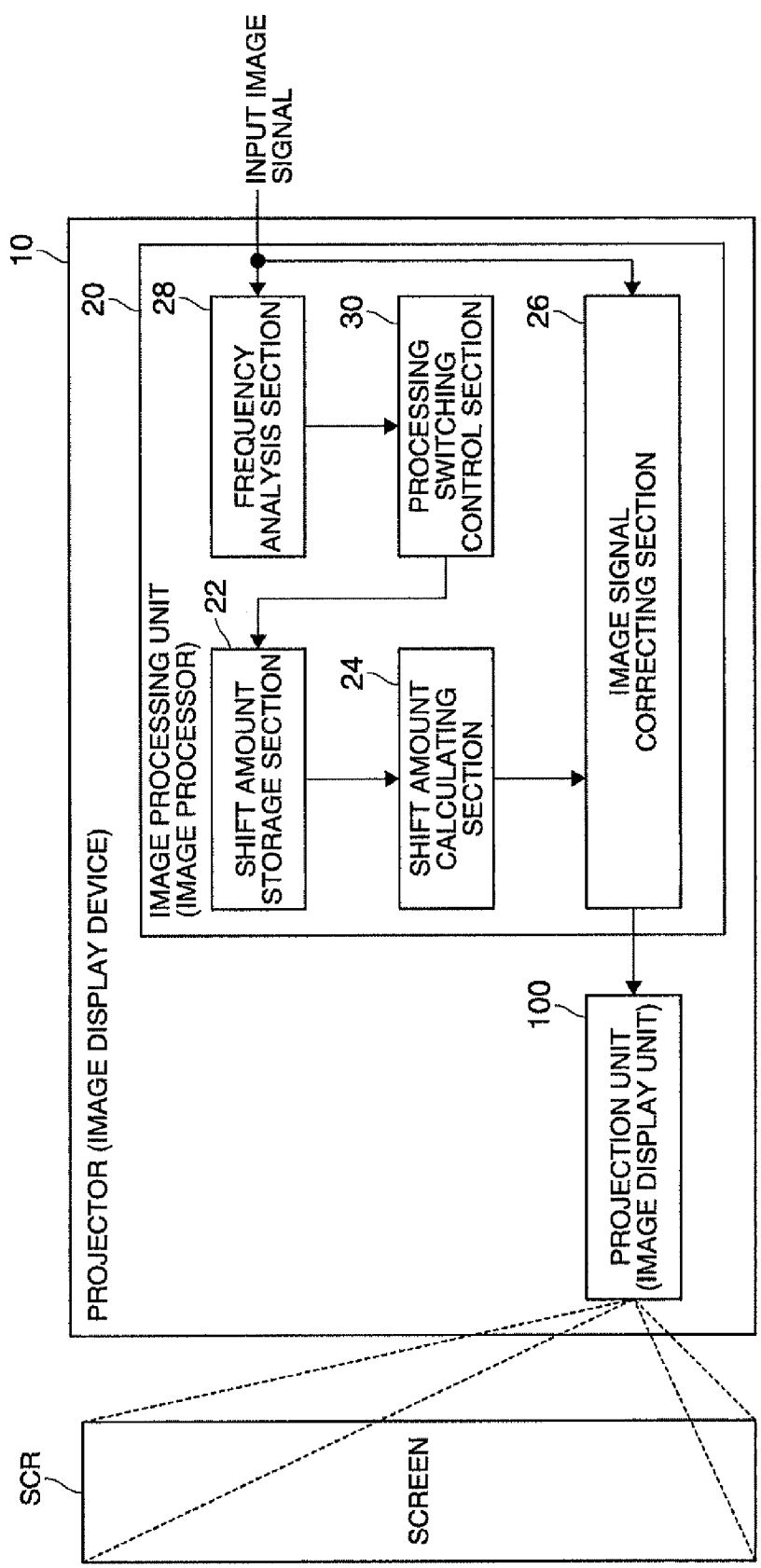
FIG. 1 is a block diagram illustrating an example of the configuration of a projector as an image display device according to a first embodiment of the invention.

FIG. 1 is a block diagram illustrating an example of the configuration of a projector as an image display device according to a first embodiment of the invention.

A projector 10 as an image display device according to the first embodiment performs image display by projecting light, which is modulated on the basis of image signals corresponding to a plurality of sub-pixels that form one pixel, onto a screen SCR. Here, a display pixel which forms a display image projected onto the screen SCR is formed by display sub-pixels corresponding to sub-pixels that form one pixel.

The projector 10 includes an image processing unit 20 as an image processor and a projection unit 100 as an image display unit.

The image processing unit 20 performs correction processing on an input image signal, which corresponds to a pixel value of each sub-pixel, according to shift amounts of display positions of display sub-pixels which form each display pixel of the display image projected onto the screen SCR. The input image signal is generated by an image signal generator (not shown) and is supplied to the image processing unit 20.

The image processing unit 20 may include a shift amount storage section 22, a shift amount calculating section 24, an image signal correcting section 26, a frequency analysis section 28, and a processing switching control section 30. The shift amount storage section 22 stores shift amounts (in a broad sense, correction parameters) of display positions of display sub-pixels corresponding to sub-pixels, which form a display pixel, using a predetermined reference position within a display image as a reference position. The shift amount calculating section 24 may calculate the shift amount of the sub-pixel position by interpolation processing using shift amounts of a plurality of display sub-pixels stored in the shift amount storage section 22 as representative points of one screen of a display image. Accordingly, the shift amount calculating section 24 may calculate the shift amounts of display sub-pixels for all pixels of one screen.

The image signal correcting section 26 performs correction processing of image signals, which correspond to sub-pixels that form each pixel of an input image, on the basis of the shift amounts stored in the shift amount storage section 22 or the shift amounts calculated by the shift amount calculating section 24. In addition, the image signal correcting section 26 may perform different correction processing according to a spatial frequency of an input image.

Then, the frequency analysis section 28 may analyze the spatial frequency of the input image and output the analysis result. The analysis result of the frequency analysis section 28 is transmitted to the processing switching control section 30. The processing switching control section 30 may rewrite the shift amounts stored in the shift amount storage section 22 or change the shift amounts from the shift amount storage section 22 according to the analysis result of the frequency analysis section 28. Accordingly, since the image signal correcting section 26 can correct an image signal on the basis of the shift amount changed according to the analysis result of the frequency analysis section 28, correction processing of the image signal can be performed differently according to the analysis result of the frequency analysis section 28.

An image signal corrected by the image processing unit 20 is supplied to the projection unit 100. The projection unit 100 includes a plurality of liquid crystal panels, for example, and projects an image onto the screen SCR on the basis of image signals of sub-pixels which form one pixel. More specifically, the projection unit 100 modulates light from a light source (not shown) on the basis of the image signal corrected by the image processing unit 20 and performs projection onto the screen SCR using the modulated light.

Figure 2:
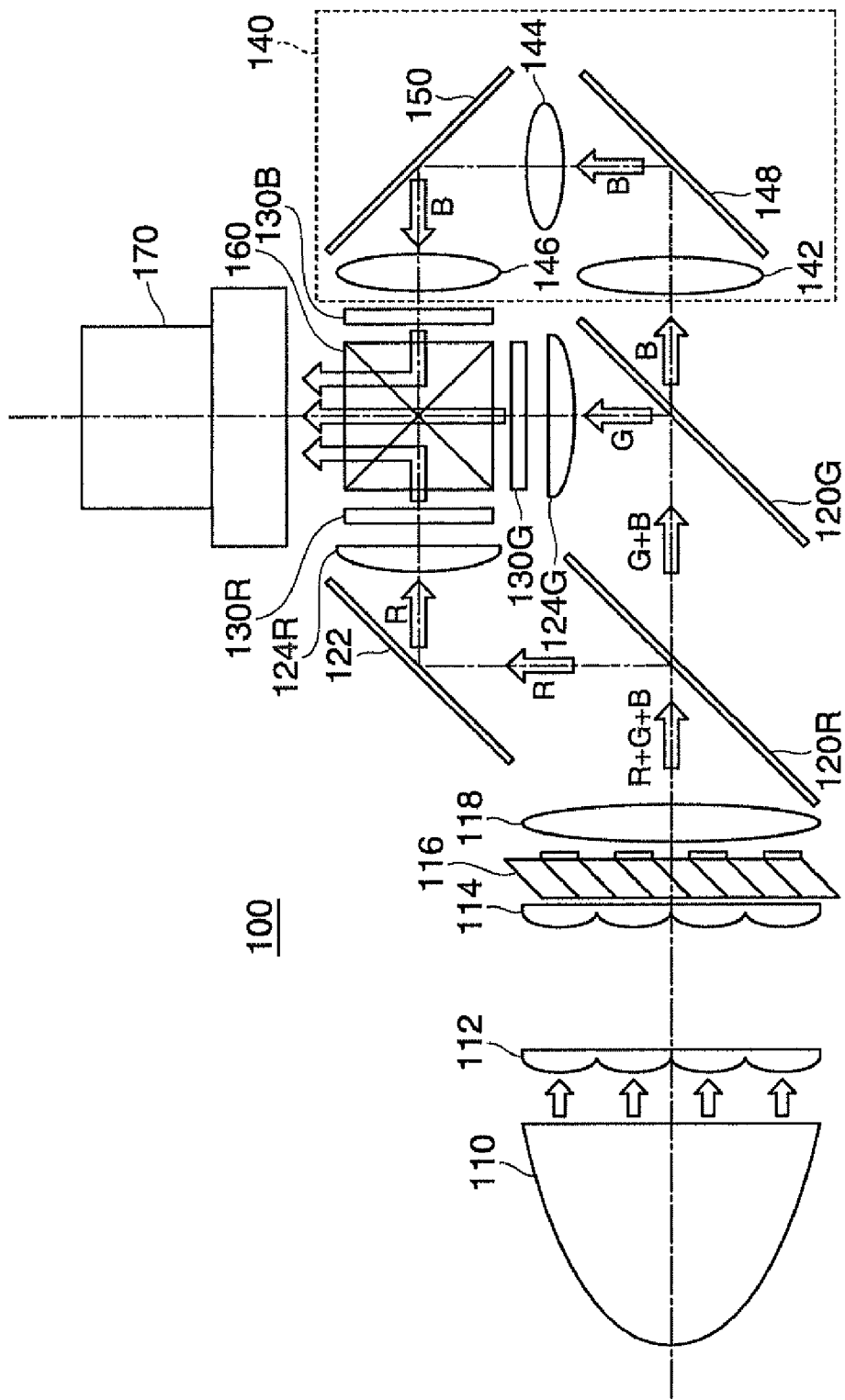
FIG. 2 is a view illustrating an example of the configuration of a projection unit of FIG. 1.

FIG. 2 shows an example of the configuration of the projection unit 100 of FIG. 1. In FIG. 2, an explanation is made assuming the projector 10 in the first embodiment is a so-called three plate type LCD projector. However, the image display device of the invention is not limited to the so-called three plate type LCD projector.

The projection unit 100 includes a light source 110, integrator lenses 112 and 114, a polarization conversion element 116, a superposition lens 118, a dichroic mirror 120R for R, a dichroic mirror 120G for G, a reflecting mirror 122, a field lens 124R for R, a field lens 124G for G, a liquid crystal panel 130R (first light modulation element) for R, a liquid crystal panel 130G (second light modulation element) for G, a liquid crystal panel 130B (third light modulation element) for B, a relay optical system 140, a cross dichroic prism 160, and a projection lens 170. Liquid crystal panels used as the liquid crystal panel 130R for R, the liquid crystal panel 130G for G, and the liquid crystal panel 130B for B are transmissive liquid crystal display devices. The relay optical system 140 includes relay lenses 142, 144, and 146 and reflecting mirrors 148 and 150.

The light source 110 is formed by an ultrahigh-pressure mercury lamp, for example, and emits light including at least R-component light, G-component light, and B-component light. The integrator lens 112 has a plurality of small lenses for dividing light from the light source 110 into a plurality of partial light components. The integrator lens 114 has a plurality of small lenses corresponding to the plurality of small lenses of the integrator lens 112. The superposition lens 118 superimposes partial light components emitted from the plurality of small lenses of the integrator lens 112 on a liquid crystal panel.

In addition, the polarization conversion element 116 has a polarizing beam splitter array and a λ/2 plate and converts light from the light source 110 into approximately one kind of polarized light. The polarizing beam splitter array has a structure in which a polarized light separating film, which divides partial light components divided by the integrator lens 112 into p-polarized light and s-polarized light, and a reflecting film, which changes the direction of the light from the polarized light separating film, are alternately arrayed. Polarization directions of two kinds of polarized light components separated by the polarized light separating film are aligned by the λ/2 plate. The light converted into approximately one kind of polarized light by the polarization conversion element 116 is irradiated to the superposition lens 118.

The light from the superposition lens 118 is incident on the dichroic mirror 120R for R. The dichroic mirror 120R for R has a function of making R-component light reflected therefrom and G-component light and B-component light transmitted therethrough. Light transmitted through the dichroic mirror 120R for R is irradiated to the dichroic mirror 12G for G, and light reflected by the dichroic mirror 120R for R is reflected by the reflecting mirror 122 and is guided to the field lens 124R for R.

The dichroic mirror 120G for G has a function of making G-component light reflected therefrom and B-component light transmitted therethrough. Light transmitted through the dichroic mirror 120G for G is incident on the relay optical system 140, and light reflected by the dichroic mirror 120G for G is guided to the field lens 124G for G.

In the relay optical system 140, in order to make a difference between an optical path length of B-component light transmitted through the dichroic mirror 120G for G and an optical path length of the other R-component and G-component light as small as possible, the relay lenses 142, 144, and 146 are used to correct the difference of optical path lengths. Light transmitted through the relay lens 142 is guided to the relay lens 144 by the reflecting mirror 148. Light transmitted through the relay lens 144 is guided to the relay lens 146 by the reflecting mirror 150. Light transmitted through the relay lens 146 is irradiated to the liquid crystal panel 130B for B.

Light irradiated to the field lens 124R for R is converted into parallel beams to be incident on the liquid crystal panel 130C for R. The liquid crystal panel 130R for R functions as a light modulation element (light modulating section), and a transmittance (passing rate, modulation rate) thereof changes on the basis of an image signal for R. Therefore, light (light of a first color component) incident on the liquid crystal panel 130R for R is modulated on the basis of the image signal for R corrected by the image processing unit 20, and the modulated light is incident on the cross dichroic prism 160.

Light irradiated to the field lens 124G for G is converted into parallel beams to be incident on the liquid crystal panel 130G for G. The liquid crystal panel 130G for G functions as a light modulation element (light modulating section), and a transmittance (passing rate, modulation rate) thereof changes on the basis of an image signal for G. Therefore, light (light of a second color component) incident on the liquid crystal panel 130G for G is modulated on the basis of the image signal for G corrected by the image processing unit 20, and the modulated light is incident on the cross dichroic prism 160.

The liquid crystal panel 130B for B to which light converted into parallel beams by the relay lenses 142, 144, and 146 is irradiated functions as a light modulation element (light modulating section), and a transmittance (passing rate, modulation rate) thereof changes on the basis of an image signal for B. Therefore, light (light of a third color component) incident on the liquid crystal panel 130B for B is modulated on the basis of the image signal for B corrected by the image processing unit 20, and the modulated light is incident on the cross dichroic prism 160.

The liquid crystal panel 130R for R, the liquid crystal panel 130G for G, and the liquid crystal panel 130B for B have the same configuration. Each liquid crystal panel is formed by sealing liquid crystal, which is an electro-optical material, between a pair of transparent glass substrates. In each liquid crystal panel, the passing rate of each color light is modulated according to an image signal of each sub-pixel, for example, using a polysilicon thin film transistor as a switching element.

The cross dichroic prism 160 has a function of outputting mixed light, in which incident light from the liquid crystal panel 130R for R, the liquid crystal panel 130G for G, and the liquid crystal panel 130B for B are mixed, as emitted light. The projection lens 170 is a lens which forms an output image on the screen SCR in an enlarge manner and has a function of enlarging or reducing an image according to the zoom magnification.

Figure 3:
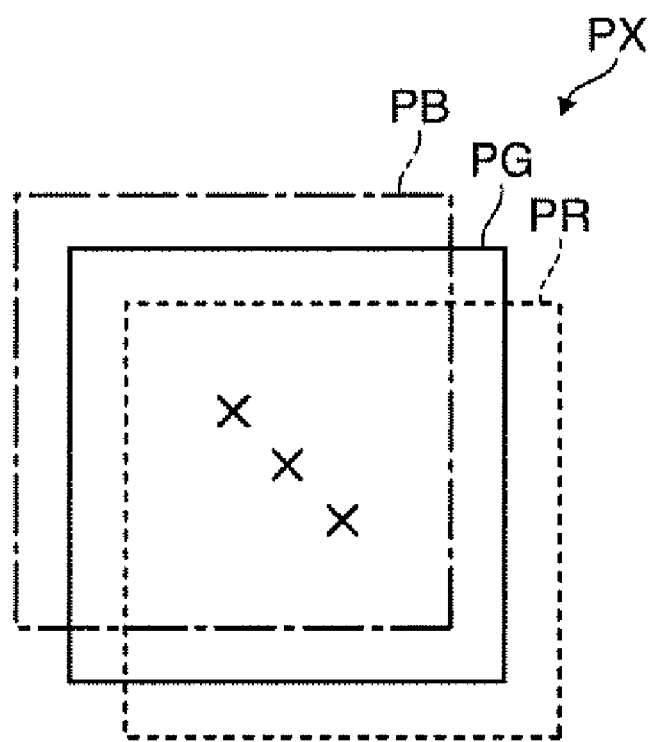
FIG. 3 is a view schematically illustrating a display pixel which forms a display image projected onto a screen by the projection unit of FIG. 2.

FIG. 3 is a view schematically illustrating a display pixel which forms a display image projected onto the screen SCR by the projection unit 100 of FIG. 2.

A display pixel PX which forms a display image projected onto the screen SCR has a bright spot, which is an image on the screen SCR of a pixel of a light modulation element (light modulating section) provided in the projector 10. The display pixel PX is matched with a pixel of the light modulation element. In addition, the projection unit 100 performs projection such that bright spots of display sub-pixels of an R-component display sub-pixel PR corresponding to a pixel of the liquid crystal panel 130R for R, a G-component display sub-pixel PG corresponding to a pixel of the liquid crystal panel 130G for G, and a B-component display sub-pixel PB corresponding to a pixel of the liquid crystal panel 130B for B overlap each other. Thus, the display pixel PX is formed by the display sub-pixels PR, PG, and PB.

However, the projection unit 100 has a configuration like FIG. 2. Accordingly, display positions of display sub-pixels are shifted on a screen due to a chromatic aberration of the optical system, adjustment accuracy of a position adjustment unit for constituent components of the optical system, and the like. Therefore, in the first embodiment, for example, using a display position of the G-component display sub-pixel PG which forms a display pixel as a reference position, a shift amount of display position of the R-component display sub-pixel PR which forms the display pixel and a shift amount of display position of the B-component display sub-pixel PB which forms the display pixel are stored. In addition, image signals of the sub-pixels are corrected on the basis of the shift amounts.

Accordingly, even if the display positions of display sub-pixels are shifted from each other, it is possible to suppress deterioration of the image quality of a display image by suppressing lowering of a sense of resolution or generation of a false color in an edge portion or endmost portion of the display image, for example.

On the other hand, as a result of correction processing of an image signal, a moiré may be generated on a display image when an input image has a high-frequency component. Therefore, in the first embodiment, generation of the moiré can be suppressed by performing correction processing of the image signal differently when an input image has a frequency component equal to or larger than a predetermined threshold value.

In the projector 10 according to the first embodiment which has the above-described configuration, processing for acquiring shift amounts of sub-pixels is performed first. This acquisition processing is performed, for example, in an inspection process in manufacturing the projector 10.

Figure 4:
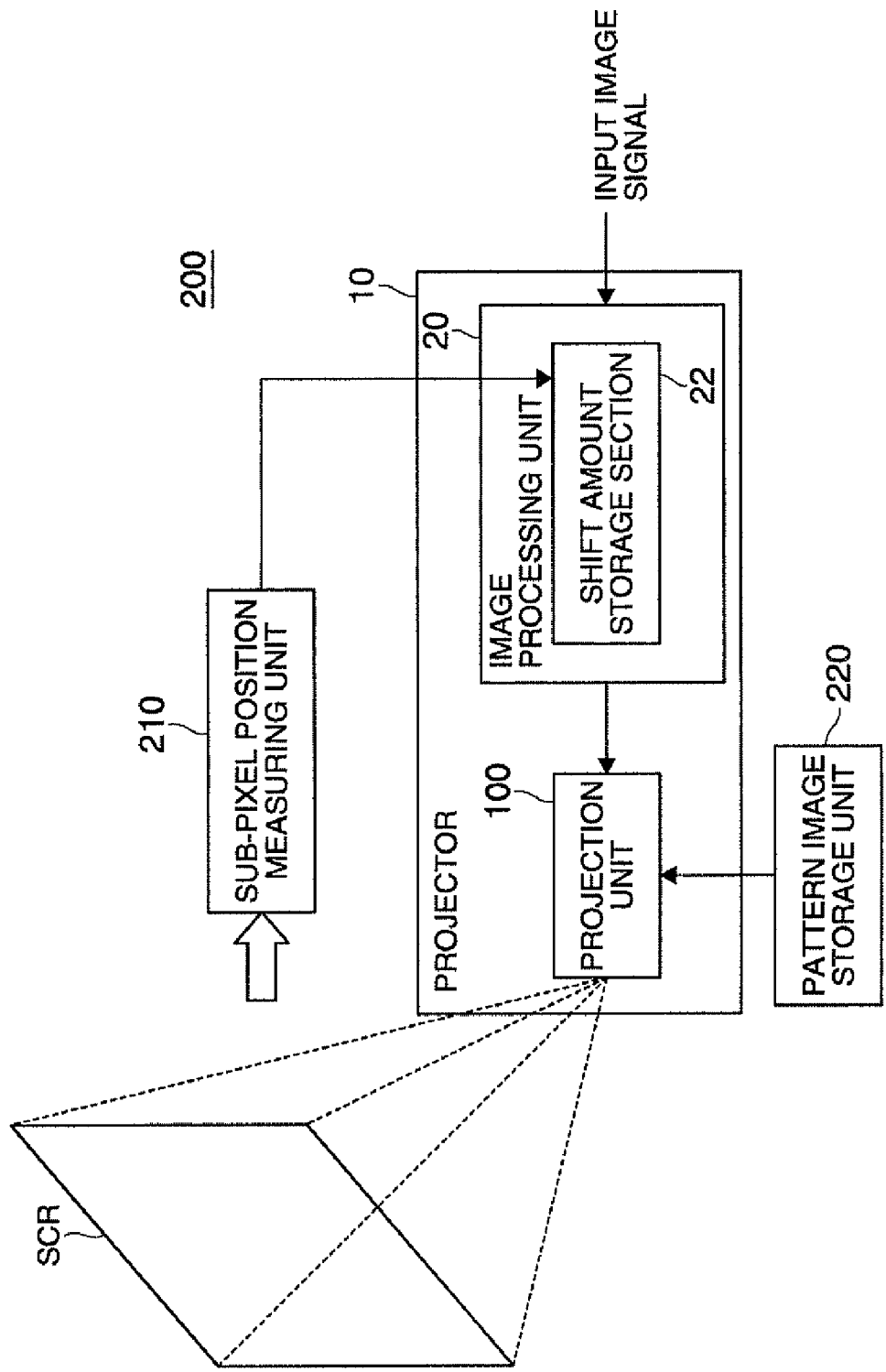
FIG. 4 is a block diagram illustrating an example of the configuration of a measurement system which measures the shift amount of a display sub-pixel position of the projector in the first embodiment.

FIG. 4 is a block diagram illustrating an example of the configuration of a measurement system which measures the shift amount of a display sub-pixel position of the projector 10 in the first embodiment. In FIG. 4, the same portions as in FIG. 1 are denoted by the same reference numerals, and the explanation will be appropriately omitted.

A measurement system 200 includes the projector 10, a sub-pixel position measuring unit 210, and a pattern image storage unit 220. In addition, the projector 10 may also include the sub-pixel position measuring unit 210 and the pattern image storage unit 220.

The sub-pixel position measuring unit 210 includes an imaging device, such as a digital still camera, and measures the display position of a display sub-pixel which forms a display pixel on the screen SCR projected by the projection unit 100. The pattern image storage unit 220 stores a pattern image for measuring the position of a display sub-pixel of a projection image (display image) projected onto the screen SCR. The sub-pixel position measuring unit 210 images an image, which is projected onto the screen SCR by the projection unit 100, using a pattern image stored in the pattern image storage unit 220 and measures the display position of a display sub-pixel, which forms each display pixel, using the imaging data as image information. The shift amount of the display position of the display sub-pixel measured by the sub-pixel position measuring unit 210 is stored in the shift amount storage section 22 of the image processing unit 20.

Figure 5:
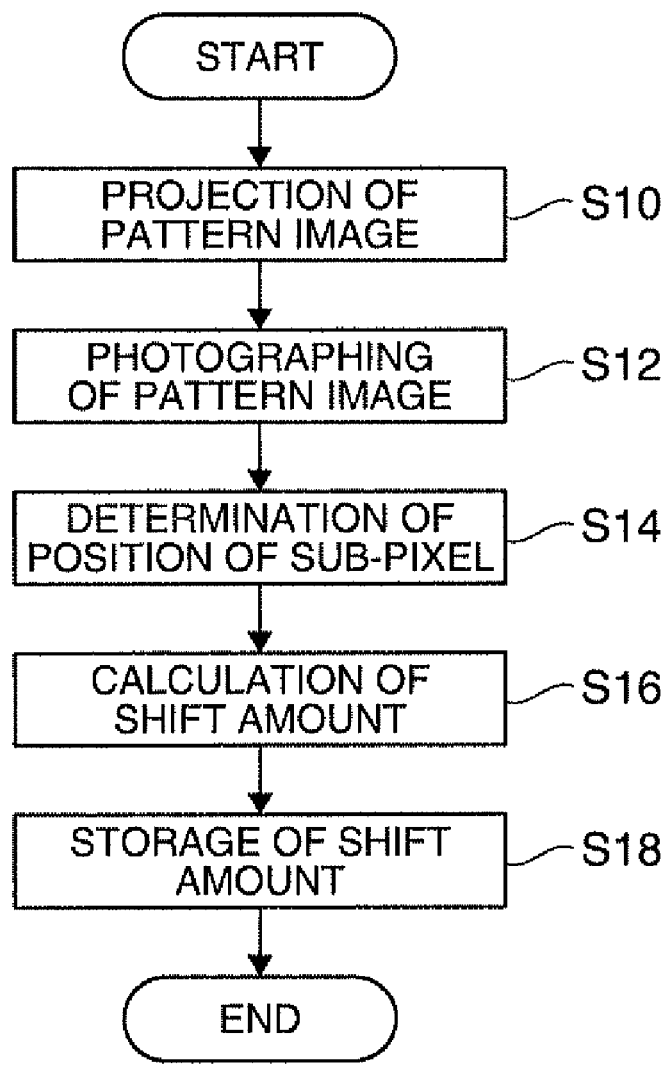
FIG. 5 is a flow chart illustrating an example of processing for acquiring the shift amount of the display sub-pixel position in the measurement system of FIG. 4.

FIG. 5 is a flow chart illustrating an example of processing for acquiring the shift amount of the display sub-pixel position in the measurement system 200 of FIG. 4.

First, in the projector 10, image information corresponding to a pattern image stored in the pattern image storage unit 220 is read and the projection unit 100 projects the pattern image onto the screen SCR (step S10). After projecting the pattern image, the sub-pixel position measuring unit 210 of the projector 10 photographs a display image to be displayed on the screen SCR (step S12). The sub-pixel position measuring unit

210 photographs the display image with a larger number of imaging pixels than the number of pixels of the display image to be displayed on the screen SCR. That is, the sub-pixel position measuring unit 210 photographs and acquires a display pixel, which is equivalent to one pixel of the display image to be displayed on the screen SCR, with a larger number of imaging pixels than one pixel.

Then, the sub-pixel position measuring unit 210 determines the display position of the display sub-pixel (step S14). Then, the sub-pixel position measuring unit 210 or the image processing unit 20 calculates a shift amount of the display position of the display sub-pixel determined in step S14 using a predetermined reference position within the display image as a reference position (step S16) and stores the calculated shift amount in the shift amount storage section 22 (step S18), completing the series of processing (End).

Figure 6:
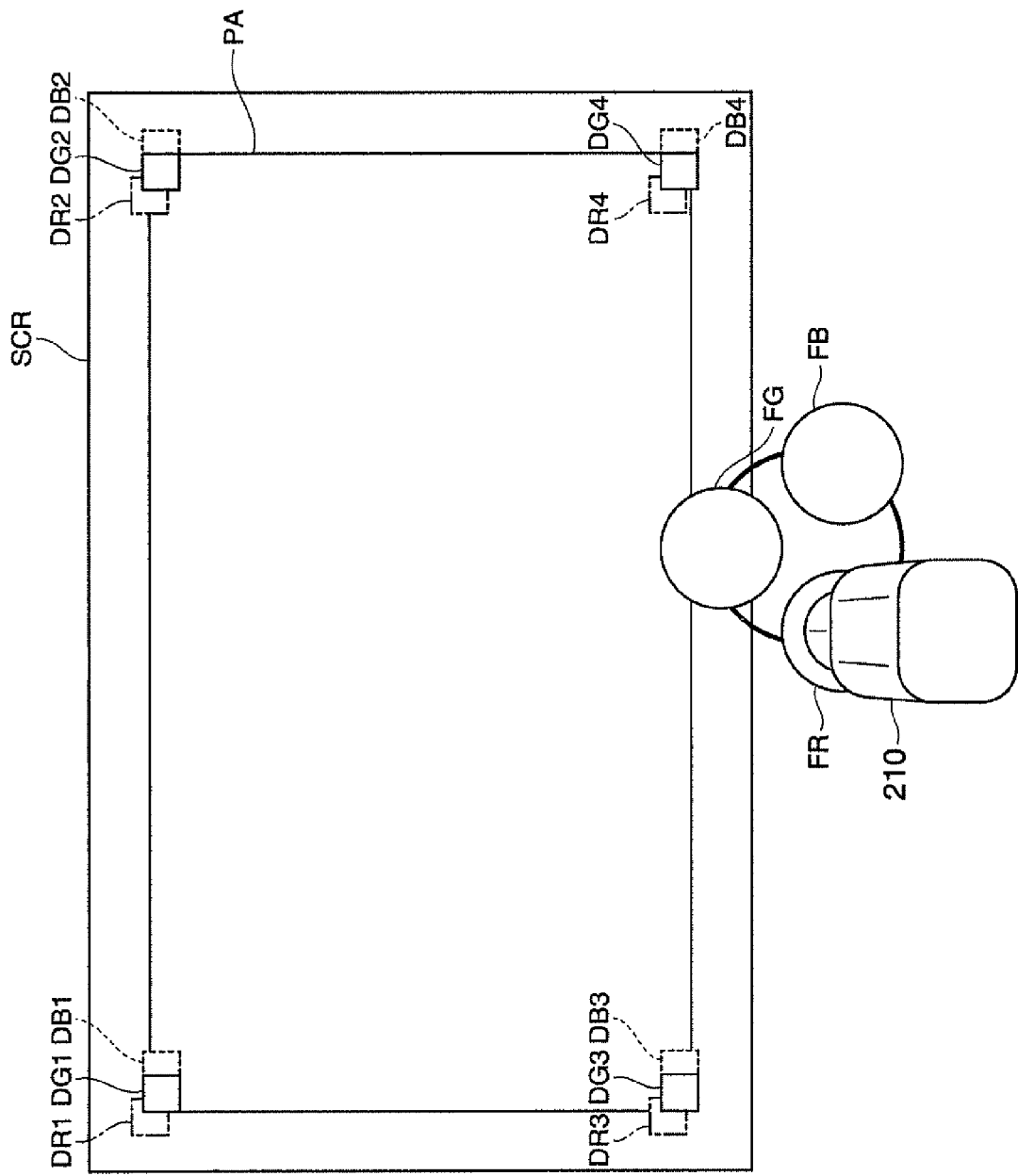
FIG. 6 is a view illustrating an example of imaging processing of a pattern image in the first embodiment.

FIG. 6 shows an example of imaging processing of a pattern image in the first embodiment. In FIG. 6, the same portions as in FIG. 4 are denoted by the same reference numerals, and the explanation will be appropriately omitted.

For example, In FIG. 6, the display positions of display sub-pixels corresponding to sub-pixels which form one pixel are shifted from each other when a pattern image in the first embodiment is projected onto the screen SCR. Although the optical system of the projector 10 needs to be adjusted such that the display positions of display sub-pixels which form a display pixel are equal, it is not easy to make the display positions of display sub-pixels, which form one display pixel, completely equal due to an aberration and the like of the optical system.

A pattern image stored in the pattern image storage unit 220 has four pixels at four corners of a projected area PA projected to the screen SCR. Each pixel has an R-component display sub-pixel, a G-component display sub-pixel, and a B-component display sub-pixel. In addition, each display sub-pixel is schematically shown to have a rectangular shape. In practice, however, the shape of a display pixel does not become a rectangular shape due to a distortion aberration and the like of the lens.

In step S12 of FIG. 5, all sub-pixels which form one pixel are projected at the same time, and the sub-pixel position measuring unit 210 images a display image of the screen SCR through an R-component color filter FR. Similarly, the sub-pixel position measuring unit 210 images a display image of the screen SCR through a G-component color filter FG and then images a display image of the screen SCR through a B-component color filter FB. Accordingly, a display sub-pixel corresponding to an R-component sub-pixel, a display sub-pixel corresponding to a G-component sub-pixel, and a display sub-pixel corresponding to a B-component sub-pixel can be acquired.

In addition, a method of acquiring display sub-pixels is not limited to that described in FIG. 6. For example, it may be possible to display sub-pixels and to repeat imaging the display sub-pixels for every color component without providing a color filter.

In step S12 of FIG. 5, the sub-pixel position measuring unit 210 or the image processing unit 20 acquires the imaging data of display sub-pixels DG1 to DG4 corresponding to G-component sub-pixels by imaging of the sub-pixel position measuring unit 210. Then, in step S14 of FIG. 5, the sub-pixel position of the display sub-pixel corresponding to the G-component sub-pixel is determined in a region of each of the display sub-pixels DG1 to DG4 corresponding to the G-component sub-pixels.

As this determination processing, a pixel with a largest pixel value can be determined as the sub-pixel position. For example, it is possible to calculate a brightness histogram of a region of each display pixel and specify a pixel with the largest brightness as a pixel whose pixel value is largest. Alternatively, it is also possible to calculate a brightness histogram of a region of each display pixel and determine the central position of a pixel with a predetermined threshold value or more as a sub-pixel position.

Similarly, also for R and B components, sub-pixel positions corresponding to display sub-pixels DR1 to DR4 and DB1 to DB4 corresponding to sub-pixels are determined. As a result, sub-pixel positions of the display sub-pixels of R, G, and B components are determined. For example, shift amounts of sub-pixel positions of display sub-pixels corresponding to the sub-pixels of R and B components when the sub-pixel position of a display sub-pixel corresponding to the G-component sub-pixel is set as a reference position are stored in the shift amount storage section 22.

That is, in the first embodiment, shift amounts are the shift amount of the display position of a display sub-pixel corresponding to an R-component sub-pixel when the display position of a display sub-pixel corresponding to a G-component sub-pixel is set as the reference position and the shift amount of the display position of a display sub-pixel corresponding to a B-component sub-pixel when the display position of the display sub-pixel corresponding to the G-component sub-pixel is set as the reference position. Thus, the reference position is a display position of a display sub-pixel corresponding to a G-component sub-pixel which forms a pixel.

Accordingly, the capacity for shift amounts to be stored can be significantly reduced by defining the shift amounts of display positions of other display sub-pixels using a display position of one display sub-pixel which forms a display pixel as a reference position. Furthermore, by setting the display position of a display sub-pixel corresponding to the G-component sub-pixel, among display sub-pixels of a plurality of color components which form a display pixel, as a reference position, an image signal corresponding to display sub-pixels of other color components can be corrected with the display sub-pixel of the color component, which is easy to be recognized to human eyes, as a reference. As a result, deterioration of the image quality can be prevented.

Thus, by providing the sub-pixel position measuring unit 210 so that a display sub-pixel projected by the projector 10 is imaged and the shift amount of display position of the sub-pixel is calculated, deterioration of the image quality can be prevented even if there is an individual difference of a projector in shifting of the display position of a display sub-pixel.

Next, an operation of each section of the image processing unit 20 of FIG. 1 will be described.

Figure 7:
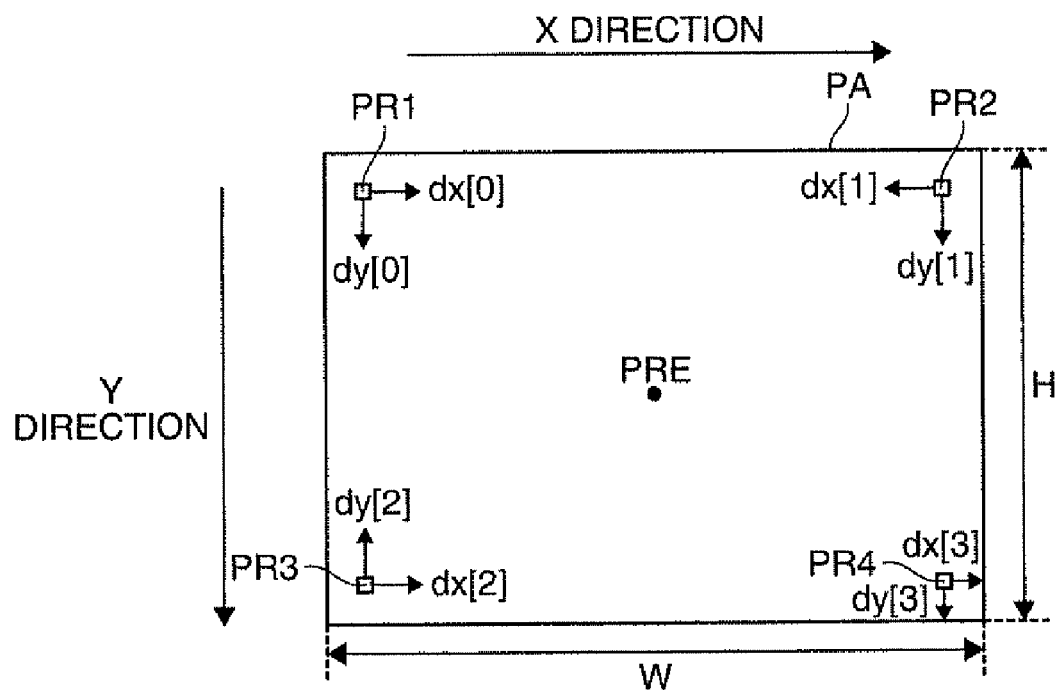
FIG. 7 is a view for explaining an operation of a shift amount calculating section of FIG. 1.

FIG. 7 is a view for explaining an operation of the shift amount calculating section 24 of FIG. 1.

FIG. 7 shows the projected area PA of a display image (the number of pixels in the horizontal direction is W, and the number of pixels in the vertical direction is H) projected by the projection unit 100. The shift amount storage section 22 stores shift amounts of display positions of display sub-pixels which form display pixels at or near four corners of a display image.

Moreover, in FIG. 7, the shift amounts of display positions of R-component display sub-pixels PR1 to PR4, for example, are schematically shown. The shift amount includes a shift amount dx in an x direction, which is the horizontal direction, and a shift amount dy in a y direction, which is a vertical direction. That is, the shift amount storage section 22 stores a shift amount dx[0] in the x direction and a shift amount dy[0]

in the y direction, for example, for the shift amount of the display position of the display sub-pixel PR1.

Here, it is preferable that the shift amount of the display position of the display sub-pixel be normalized as follows.

Figure 8:
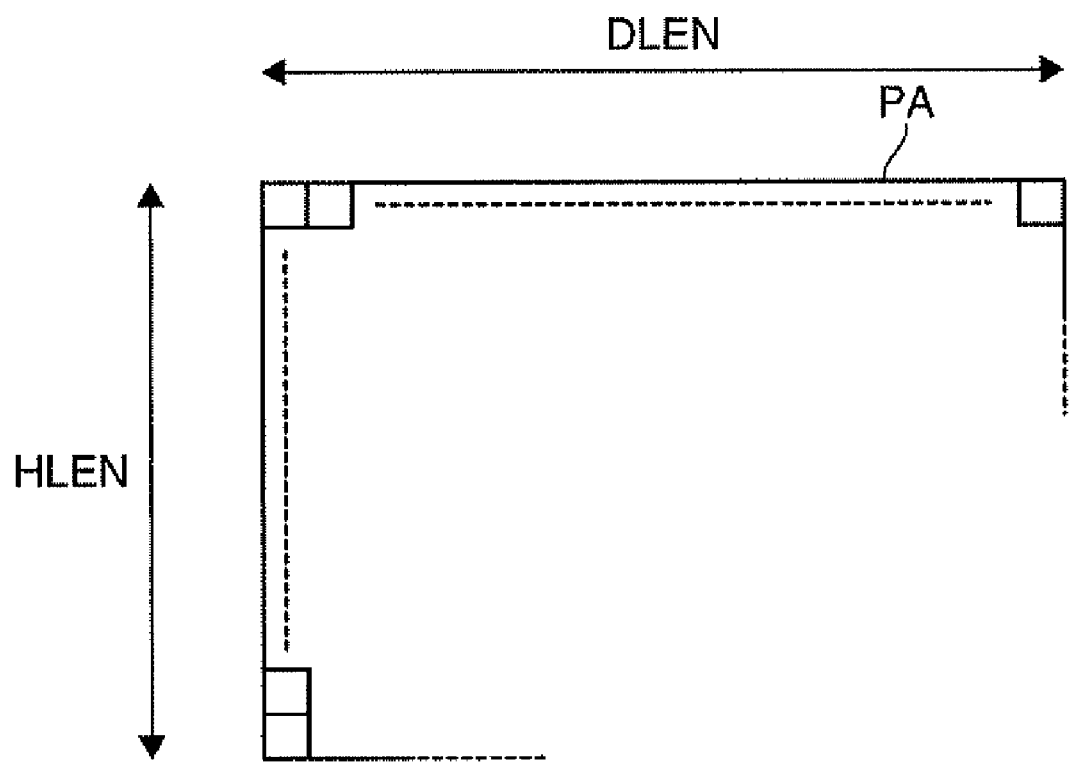
FIG. 8 is a view for explaining the shift amount of the display position of a display sub-pixel in the first embodiment.

FIG. 8 is a view for explaining the shift amount of the display position of a display sub-pixel in the first embodiment. In FIG. 8, the same portions as in FIG. 7 are denoted by the same reference numerals, and the explanation will be appropriately omitted.

The size of the projected area PA of the display image projected by the projection unit 100 of the projector 10 is uniquely set. Here, assuming that the horizontal length of the projected area PA is DLEN and the number of pixels in the horizontal direction is D, it can be specified to which number of pixels the numeric value of the shift amount in the x direction is equivalent by calculating the shift amount in a condition where DLEN/D is set as one unit. Similarly, assuming that the vertical length of the projected area PA is HLEN and the number of pixels in the vertical direction is H, it can be specified to which number of pixels the numeric value of the shift amount in the y direction is equivalent by calculating the shift amount in a condition where HLEN/H is set as one unit.

Using the shift amounts dx[0] and dy[0] of the display sub-pixel PR1, shift amounts dx[1] and dy[1] of the display sub-pixel PR2, shift amounts dx[2] and dy[2] of the display sub-pixel PR3, and shift amounts dx[3] and dy[3] of the display sub-pixel PR4 normalized as described above, the shift amount calculating section 24 calculates a shift amount x_shift in the x direction and a shift amount y_shift in the y direction of a display sub-pixel PRE of the projected area PA.

More specifically, the shift amount calculating section 24 calculates a shift amount x_shift(x, y) of the display sub-pixel PRE in the x direction, which is located at coordinates (x, y) when the upper left corner of the projected area PA is set as the origin, on the basis of shift amounts dx[0] to dx[3]. In this case, the shift amount calculating section 24 calculates the shift amount x_shift(x, y) by linear interpolation processing as shown in the following expression.

$$x\_shift(x, y) = \left(1 - \frac{y}{H-1}\right) \cdot \left\{\left(1 - \frac{x}{W-1}\right) \cdot dx[0] + \left(\frac{x}{W-1}\right) \cdot dx[1]\right\} + \left(\frac{y}{H-1}\right) \cdot \left\{\left(1 - \frac{x}{W-1}\right) \cdot dx[2] + \left(\frac{x}{W-1}\right) \cdot dx[3]\right\} \quad (1)$$

Similarly, the shift amount calculating section 24 calculates_ a shift amount y_shift(x, y) of the display sub-pixel PRE in the y direction, which is located at coordinates (x, y) when the upper left corner of the projected area PA is set as the origin, on the basis of shift amounts dy[0] to dy[3].

$$y\_shift(x, y) = \left(1 - \frac{x}{H-1}\right) \cdot \left\{\left(1 - \frac{y}{W-1}\right) \cdot dy[0] + \left(\frac{y}{W-1}\right) \cdot dy[1]\right\} + \left(\frac{x}{H-1}\right) \cdot \left\{\left(1 - \frac{y}{W-1}\right) \cdot dy[2] + \left(\frac{y}{W-1}\right) \cdot dy[3]\right\} \quad (2)$$

Moreover, although the shift amounts of the R-component display sub-pixel in the projected area PA were calculated in the explanation of FIGS. 7 and 8, shift amounts of a B-component display sub-pixel in the projected area PA may also be calculated similarly. Thus, even if the shift amount storage section 22 stores only the shift amounts of four corners of the projected area PA, for example, the shift amount calculating section 24 can calculate the shift amounts of all display sub-pixels of other color components excluding the G component in the projected area PA.

Figure 9:
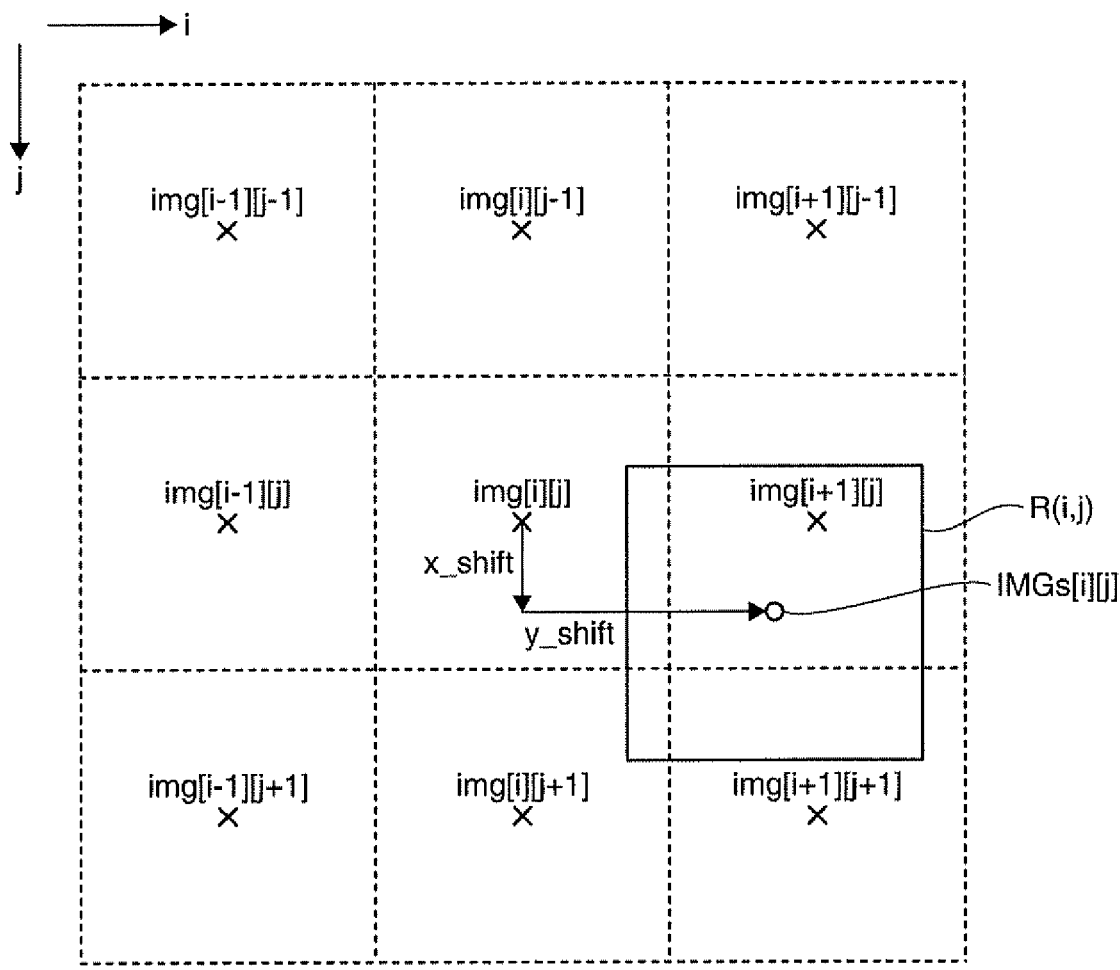
FIG. 9 is a view for explaining an operation of an image signal correcting section of FIG. 1.

FIG. 9 is a view for explaining an operation of the image signal correcting section 26 of FIG. 1.

FIG. 9 shows an explanatory view of correction processing of a pixel value IMGs[i][j] of a sub-pixel R(i, j) corresponding to an R-component display sub-pixel, for example. In FIG. 9, R-component sub-pixels around the R-component sub-pixel R(i, j) defined in the coordinate system in which the upper left corner of a projected area is set as an origin, for example, are schematically shown. Here, it is assumed that an R-component sub-pixel R(i−1, j−1) has a pixel value img[i−1][j−1] and an R-component sub-pixel R(i, j+1) has a pixel value img[i][j+1], for example.

The display position of a display sub-pixel corresponding to the sub-pixel R(i, j) of FIG. 9 is assumed to be shifted by x_shift in the x direction and by y_shift in the y direction from the display position of a display sub-pixel corresponding to a G-component sub-pixel. The shift amount is read from the shift amount storage section 22 or is calculated by the shift amount calculating section 24 described in FIGS. 7 and 8.

The image signal correcting section 26 calculates the pixel value IMGs[i][j] of the sub-pixel R(i, j) on the basis of the shift amount by an area gradation method using pixel values of sub-pixels (sub-pixels adjacent to the sub-pixel R(i, j) in the x direction/sub-pixels adjacent to the sub-pixel R(i, j) in the y direction) around the sub-pixel R(i, j) and outputs the pixel value IMGs[i][j] to the projection unit 100 as a corrected image signal.

$$\text{IMGs}[i][j] = (1 - y\_shift) \cdot \{(1 - x\_shift) \cdot \text{img}[i][j] + x\_shift \cdot \text{img}[i+1][j]\} + y\_shift \{(1 - x\_shift) \cdot \text{img}[i][j+1] + x\_shift \cdot \text{img}[i-1][j+1]\} \quad (3)$$

In the first embodiment, in order to change such correction processing of the image signal correcting section 26 according to the spatial frequency of an input image, the processing switching control section 30 performs a switching control of correction processing on the basis of an analysis result of the frequency analysis section 28.

Figure 10:
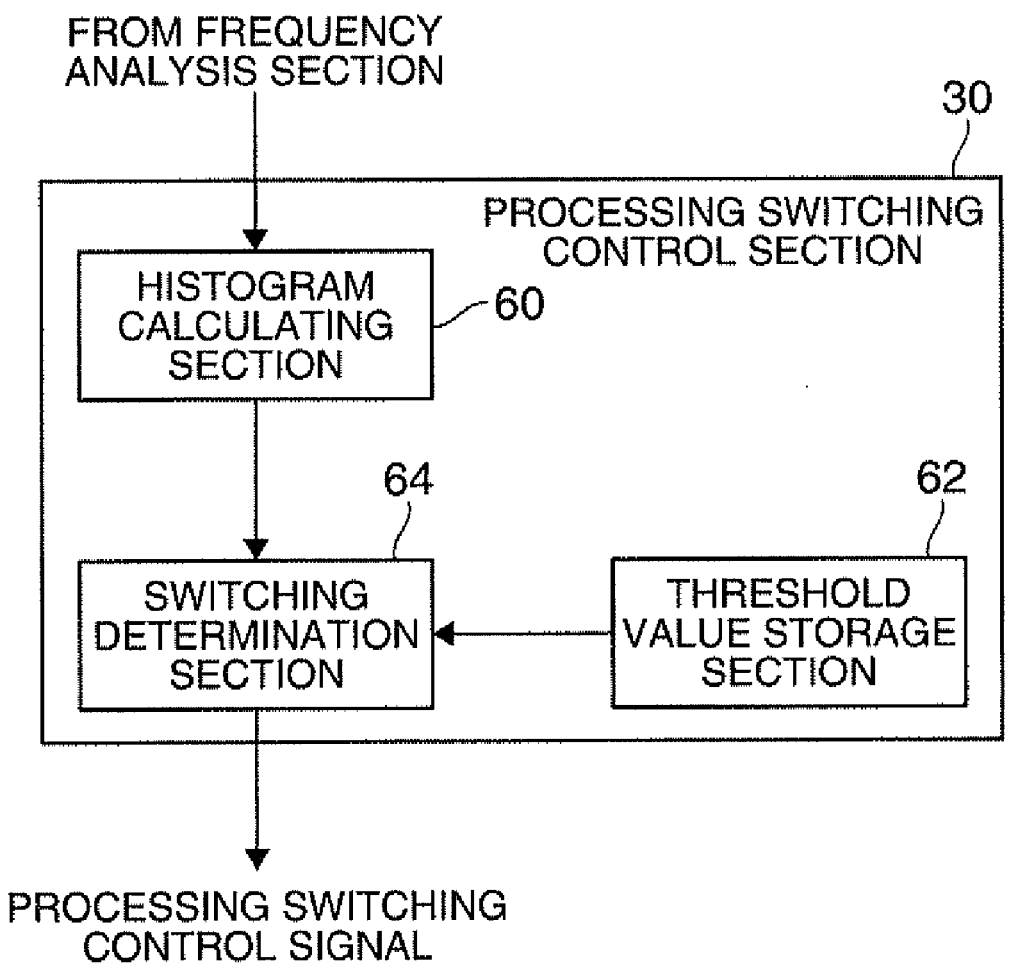
FIG. 10 is a block diagram illustrating an example of the configuration of a processing switching control section of FIG. 1.

FIG. 10 is a block diagram illustrating an example of the configuration of the processing switching control section 30 of FIG. 1.

The processing switching control section 30 includes a histogram calculating section 60, a threshold value storage section 62, and a switching determination section 64. A result (for example, a Fourier transform result or a characteristic extraction filtering result) of analyses performed for all sub-pixels that form each pixel of an input image by the frequency analysis section 28 is input to the histogram calculating section 60. The histogram calculating section 60 calculates a histogram on the basis of the analysis result of the frequency analysis section 28. On the basis of the histogram calculated by the histogram calculating section 60, the switching determination section 64 determines whether to change correction processing of the image signal correcting section 26 with a threshold value stored in the threshold value storage section 62 as a reference. The determination result of the switching determination section 64 is output as a processing switching control signal.

In addition, although the histogram calculating section 60 is built in the processing switching control section 30 in the explanation of FIG. 10, the histogram calculating section 60 may be built in the frequency analysis section 28.

Figure 11A:
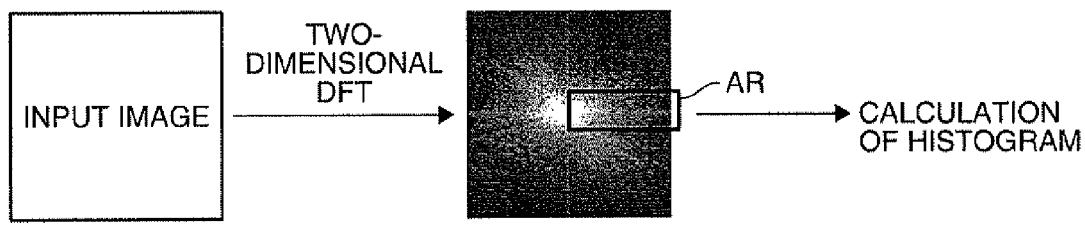
FIGS. 11A and 11B are views for explaining operations of frequency analysis section and processing switching control section.
Figure 11B:
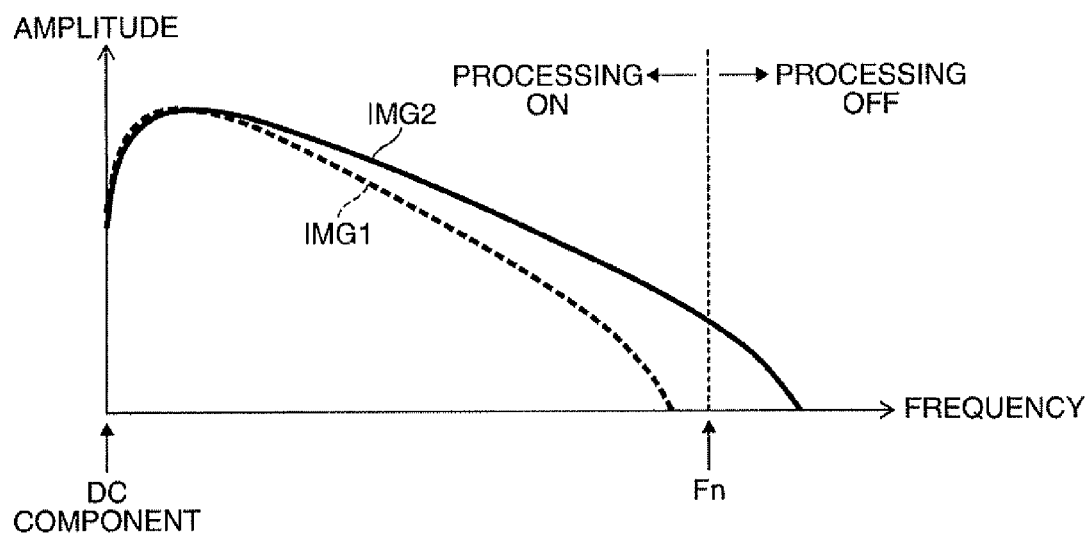

FIGS. 11A and 11B are views for explaining operations of the frequency analysis section 28 and processing switching control section 30. FIG. 11A is an explanatory view of an operation example of the frequency analysis section 28. FIG. 11B is an explanatory view of an operation example of the processing switching control section 30 which performs switching determination on the basis of the analysis result of the frequency analysis section 28 of FIG. 11A.

The frequency analysis section 28 to which an input image was input analyzes a spatial frequency of the input image, for example, by two-dimensional discrete Fourier transform (DFT). As a result, as shown in FIG. 11A, it is mapped to a two-dimensional coordinate system in which a frequency component at the central position is 0 and the frequency component increases as the position moves to the outside, for example. Here, a larger white portion means mapping of a larger number of frequency components. Moreover, the histogram calculating section 60 makes a histogram of, for example, a region AR of the coordinate system obtained as the analysis result of the frequency analysis section 28.

The histogram calculated by the histogram calculating section 60 is shown in FIG. 11B, for example. Here, a threshold value Fn is read from the threshold value storage section 62, and the processing switching control section 30 determines whether or not a frequency component equal to or larger than the threshold value Fn is included as an analysis result of the input image. When it is determined that a frequency component equal to or larger than the threshold value Fn is included, the switching determination section 64 determines that the input image has a high-frequency image and makes a control such that correction processing of the image signal correcting section 26 is turned off. On the other hand, when it is determined that a frequency component equal to or larger than the threshold value Fn is not included, the switching determination section 64 determines that the input image does not have a high-frequency image and makes a control such that correction processing of the image signal correcting section 26 is turned on. Thus, the processing switching control section 30 changes the correction processing of the image signal correcting section 26 according to the frequency analysis result of the input image using the threshold value Fn as a reference.

For example, in FIG. 11, for an input image IMG1, since a frequency component equal to or larger than the threshold value Fn is not included therein, the processing switching control section 30 determines that the input image IMG1 is a low-frequency image and makes a control of turning on correction processing of the image signal correcting section 26. On the other hand, for an input image IMG2, since a frequency component equal to or larger than the threshold value Fn is included therein, the processing switching control section 30 determines that the input image IMG2 is a high-frequency image and makes a control of turning off correction processing of the image signal correcting section 26 so that the correction processing is omitted.

In the first embodiment, correction processing of the image signal correcting section 26 is turned off by forcibly setting all shift amounts stored in the shift amount storage section 22 or all shift amounts (both x and y components) read from the shift amount storage section 22 to 0. Accordingly, when it is determined that the correction processing of the image signal correcting section 26 is turned off by the processing switching control section 30, the shift amounts stored in the shift amount storage section 22 or the shift amounts read from the shift amount storage section 22 are set to 0, for example, by a processing switching control signal. In this way, ON/OFF control of the correction processing of the image signal correcting section 26 can be made simply without directly controlling the image signal correcting section 26. Thus, in the first embodiment, correction processing is omitted for all sub-pixels of the first color component which form the input image on condition that a frequency component equal to or larger than a predetermined threshold value is included in at least some of the sub-pixels of the first color component which form each pixel of the input image.

Figure 12:
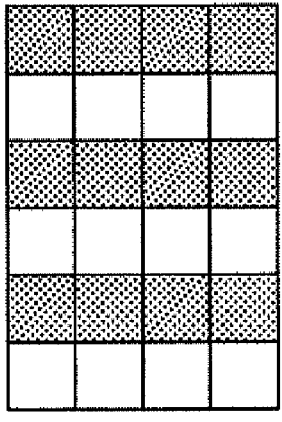
FIG. 12 is a view for explaining an operation of an image processing unit in the first embodiment.

FIG. 12 is a view for explaining an operation of the image processing unit 20 in the first embodiment. In FIG. 12, an image which does not include a frequency component equal to or larger than the threshold value Fn is a low-frequency image and an image which includes a frequency component equal to or larger than the threshold value Fn is a high-frequency image. Moreover, FIG. 12 schematically shows a display image of the projector 10 when an input image is a low-frequency image and a display image of the projector 10 when the input image is a high-frequency image.

In FIG. 12, it is assumed that display sub-pixels of R, G, and B components are shifted by 1/3pixel from each other in the horizontal direction. Here, for example, when an input image with a low spatial frequency in which white, black, and white are horizontally aligned for every two sub-pixels is input, the image processing unit 20 performs correction processing on an image signal of the input image on the basis of the shift amount. As a result, as shown in FIG. 12, an image in which generation of a false color in an edge portion or deterioration of a sense of resolution is suppressed can be displayed (F1, F2).

n the other hand, for example, when an input image with a high spatial frequency in which white, black, and white are horizontally aligned for every sub-pixel is input, the image processing unit 20 performs correction processing on an image signal of the input image on the basis of the shift amount. In this case, a moiré may be generated in the edge portion, which may lower the image quality. Accordingly, in the first embodiment, the image processing unit 20 turns off correction processing on an image signal of an input image based on the shift amount for the high-frequency image, such that an image in which generation of a moiré in the edge portion is suppressed is displayed (F3, F4).

As described above, according to the first embodiment, it is possible to display an image in which generation of moiré is suppressed regardless of a spatial frequency of an input image.

The function of the image processing unit 20 which controls ON/OFF of correction processing of the image signal correcting section 26 as described above may be realized by hardware or may be realized by software processing.

Figure 13:
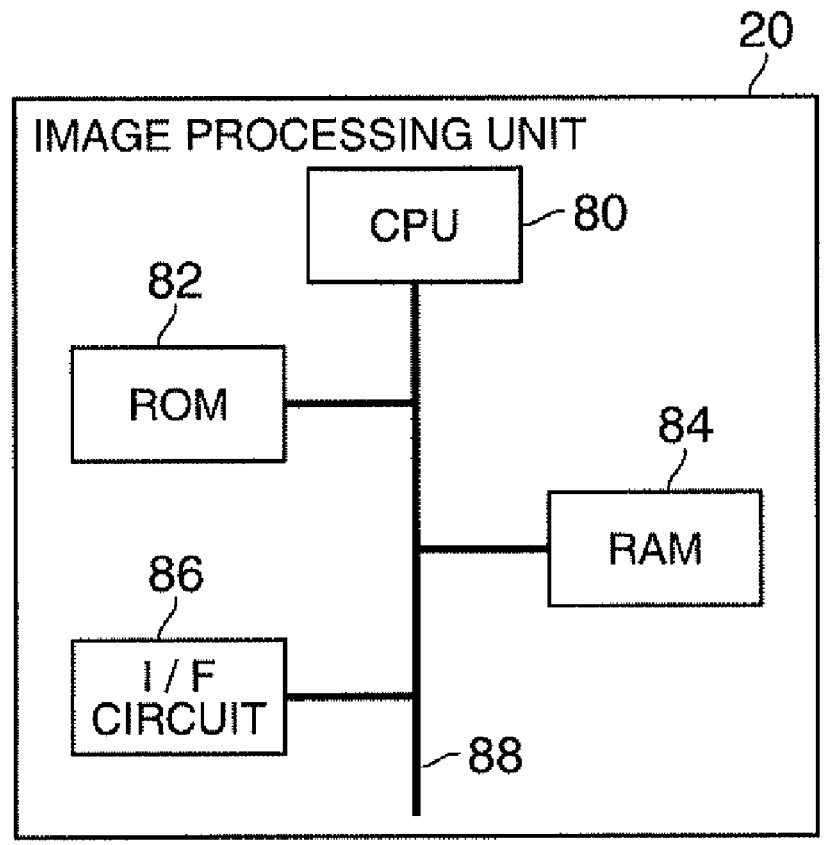
FIG. 13 is a block diagram illustrating an example of the hardware configuration of the image processing unit in the first embodiment.

FIG. 13 is a block diagram illustrating an example of the hardware configuration of the image processing unit 20 in the first embodiment.

The image processing unit 20 includes a central processing unit (CPU) 80, a read only memory (ROM) 82, a random access memory (RAM) 84, and an interface (I/F) circuit 86. The CPU 80, the ROM 82, the RAM 84, and the I/F circuit 86 are connected to each other by a bus 88.

A program is stored in the ROM 82, so that the CPU 80 which read a program through the bus 88 can execute processing corresponding to the program. The RAM 84 serves as a working memory used when the CPU 80 executes processing, or a program read by the CPU 80 is temporarily stored in the RAM 84. The I/F circuit 86 performs interface processing of an input image signal from the outside.

The function of the shift amount storage section 22 of FIG. 1 is realized by the ROM 82 or the RAM 84. The functions of the shift amount calculating section 24, image signal correcting section 26, frequency analysis section 28, and processing switching control section 30 of FIG. 1 are realized by the CPU 80 which reads a program stored in the ROM 82 or the RAM 84 through the bus 88 and executes the program. In addition, an image signal acquisition section which is not shown in FIG. 1 has a function of buffering an input image signal supplied from the outside. The function is realized, for example, by the RAM 84 or the I/F circuit 86 of FIG. 13.

Figure 14:
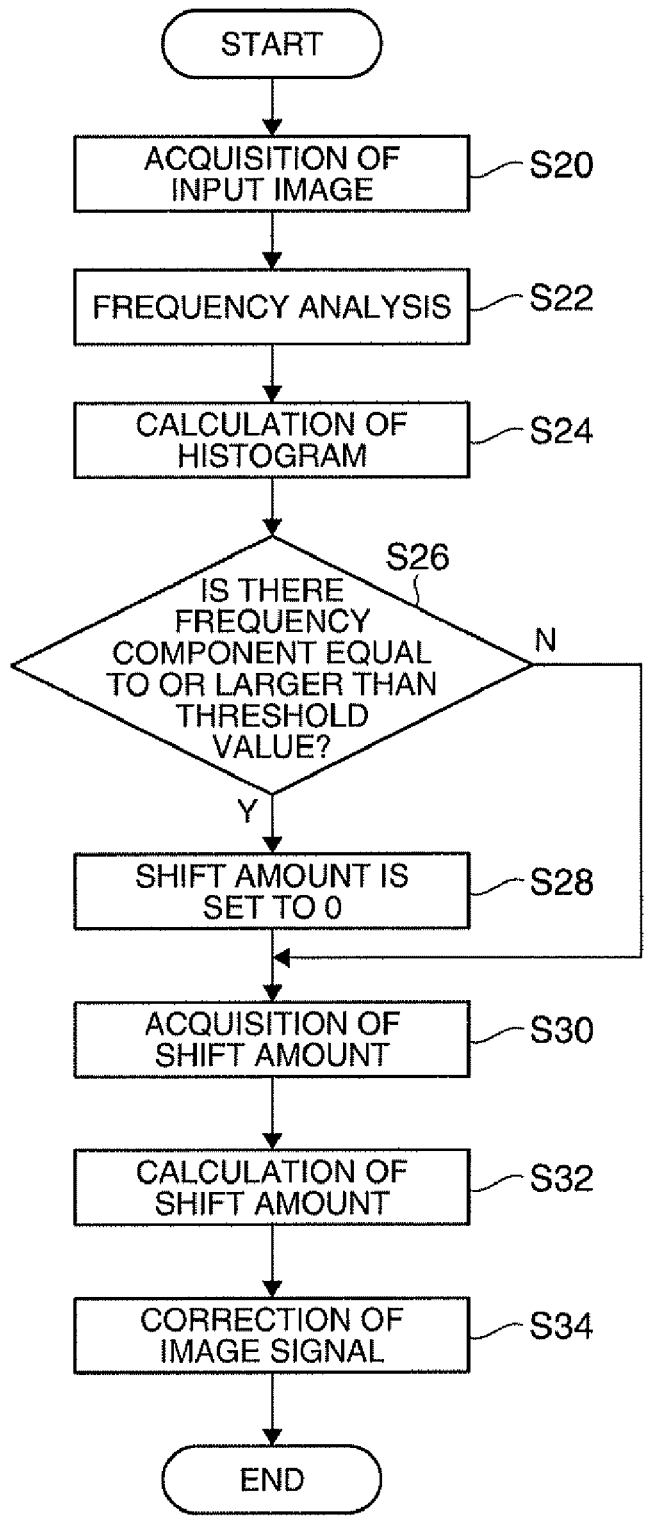
FIG. 14 is a flow chart illustrating a processing example of the image processing unit in the first embodiment.

FIG. 14 is a flow chart illustrating a processing example of the image processing unit 20 in the first embodiment.

For example, a program for realizing the processing shown in FIG. 14 is stored beforehand in the ROM 82, and the CPU 80 reads the program stored in the ROM 82 and executes processing corresponding to the program. Thus, the processing shown in FIG. 14 may be realized by software processing.

First, the image processing unit 20 acquires input image signals corresponding to sub-pixels, which form each pixel of an input image, from an image signal generator (not shown) as an input image signal acquisition step (step S20).

Then, the frequency analysis section 28 of the image processing unit 20 analyzes a spatial frequency of the input image as a frequency analysis step (step S22). Then, the frequency analysis section 28 or the processing switching control section 30 of the image processing unit 20 calculates a histogram on the basis of the analysis result of the spatial frequency of the input image analyzed in step S22 as a histogram calculation step (step S24).

Then, the processing switching control section 30 of the image processing unit 20 determines whether or not a frequency component equal to or larger than the threshold value Fn is included (step S26). When it is determined that a frequency component equal to or larger than the threshold value Fn is included (step S26: Y), the processing switching control section 30 of the image processing unit 20 sets x and y components of shift amounts stored in the shift amount storage section 22 or x and y components of shift amounts read from the shift amount storage section 22 to 0 (step S28).

When it is determined that a frequency component equal to or larger than the threshold value Fn is not included in step S26 (step S26: N) or subsequent to step S28, the shift amount calculating section 24 of the image processing unit 20 acquires the shift amounts from the shift amount storage section 22 or the shift amounts set to 0 in step S28 as a shift amount acquisition step (step S30). Then, the shift amount calculating section 24 of the image processing unit 20 calculates shift amounts of all sub-pixels of R and B components of the display image on the basis of the shift amounts acquired in step S30, as described in FIGS. 7 and 8, as a shift amount calculation step (step S32).

Then, the image signal correcting section 26 of the image processing unit 20 corrects an image signal of the sub-pixel position on the basis of the shift amounts, which were calculated in step S32, for every sub-pixel as described in FIG. 9 as an image signal correction step (step S34), completing the series of processing (End). In the image signal correction step, an image signal is interpolated according to the shift amount when the image signal is corrected using the shift amount other than 0. However, even if an image signal is corrected as shown in FIG. 9 using the shift amount set to 0 in step S28, the correction processing is substantially turned off so that the correction processing is omitted. This means that ON/OFF of correction processing can be controlled even if correction processing of an image signal is performed without exception.

The image signal corrected by the image processing unit 20 as described above is input to the projection unit 100. The projection unit 100 displays an image by projecting light, which is modulated on the basis of the image signal corrected by the image processing unit 20, onto the screen SCR as an image display step.

Figure 15:
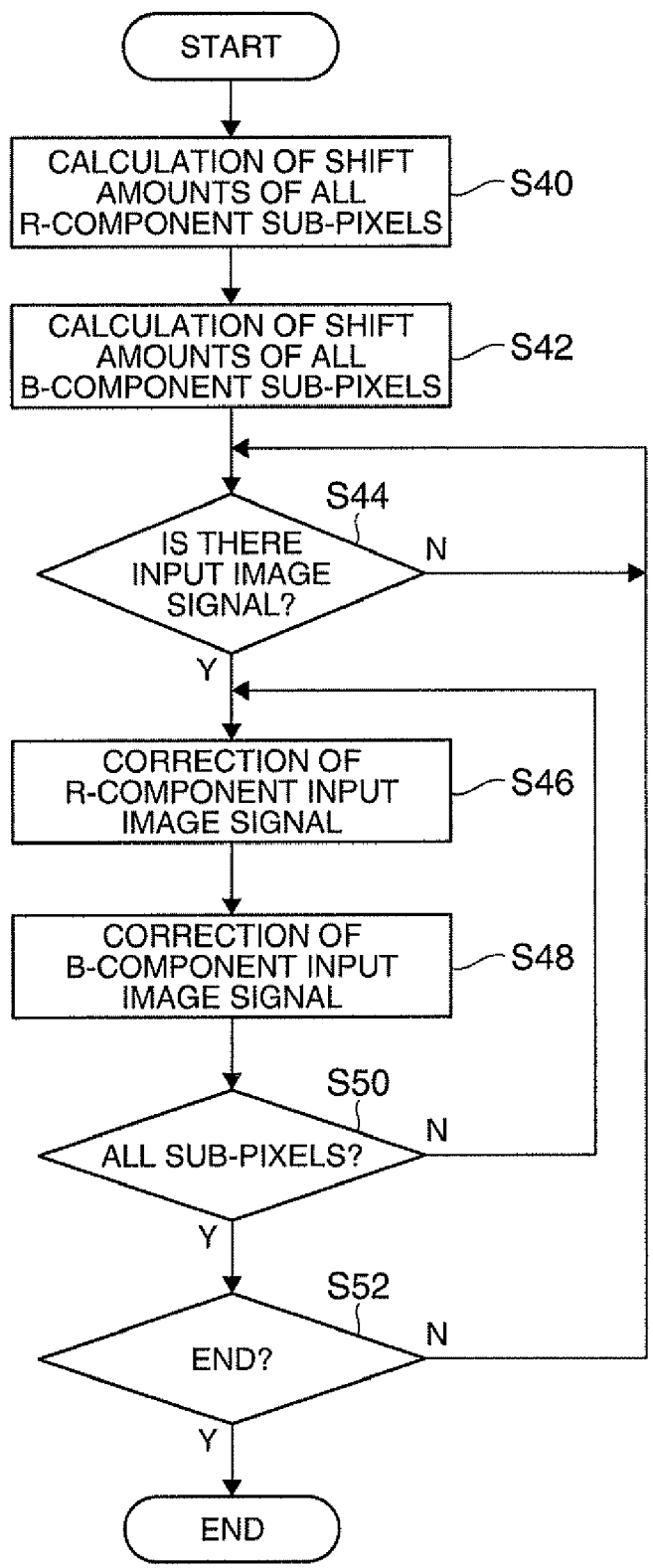
FIG. 15 is a flow chart illustrating a detailed processing example of steps S32 and S34 of FIG. 14.

FIG. 15 shows a flow chart of a detailed processing example of steps S32 and S34 of FIG. 14. For example, a program for realizing the processing shown in FIG. 15 is stored beforehand in the ROM 82, and the CPU 80 reads the program stored in the ROM 82 and executes processing corresponding to the program. Thus, the processing shown in FIG. 15 may be realized by software processing.

In the shift amount calculation step of step S32 of FIG. 14, the shift amount calculating section 24 calculates the shift amounts of all R-component sub-pixels (step S40). More specifically, the shift amount calculating section 24 calculates the shift amounts of all R-component sub-pixels within the display image by interpolation processing using the shift amounts of display sub-pixels stored in the shift amount storage section 22 or the shift amounts set to 0. Although an example of calculating the shift amount by a bilinear method was described in FIGS. 7 and 8, the shift amount calculating section 24 may also calculate the shift amounts of all sub-pixels using a nearest-neighbor method, a bicubic method, and the like.

Similarly, the shift amount calculating section 24 calculates the shift amounts of all B-component sub-pixels (step 342). Also in step S42, the shift amount calculating section 24 calculates the shift amounts of all B-component sub-pixels within the display image by interpolation processing using the shift amounts of display sub-pixels stored in the shift amount storage section 22 or the shift amounts set to 0.

Then, the image signal correcting section 26 determines whether or not there is an input image signal (step S44). When it is determined that there is no input image signal in step S44 (step S44: N), the image signal correcting section 26 waits for the input of an input image signal.

When it is determined that there is an input image signal in step S44 (step S44: Y), the image signal correcting section 26 performs correction processing on an R-component input image signal of the input image signals using the shift amounts calculated in step S40 (step 346). Then, the image signal correcting section 26 performs correction processing on a B-component input image signal of the input image signals using the shift amounts calculated in step S42 (step S48).

Until the correction processing on all sub-pixels of R and B components within the display image ends (step S50: N), the process returns to step S46 to perform correction processing on each sub-pixel within the image. On the other hand, when correction processing on all sub-pixels of R and B components within the display image ends (step S50: Y) and when correction processing according to the shift amount does not end (step S52: N), the process returns to step S44 to continue processing. When the correction processing according to the shift amount ends (step S52: Y), the series of processing is completed (End).

As described above, according to the first embodiment, even if display sub-pixels which form a display pixel are shifted from each other, generation of a false color in an endmost portion or near the edge of the display image or deterioration of a sense of resolution can be suppressed. In addition, since correction processing of an image signal is made to change according to the analysis result of a spatial frequency of an input image, it is possible to suppress a moiré generated on the display image when correction processing is performed on a high-frequency image, for example.

Second Embodiment

In the first embodiment, when an input image is a high-frequency image, both x and y components of the shift amounts from the shift amount storage section 22 are set to 0 and ON/OFF control of correction processing is similarly performed on a horizontal image signal and a vertical image signal. However, the invention is not limited thereto. In a second embodiment, ON/OFF control of correction processing is individually performed on each of the horizontal image signal and the vertical image signal.

Since the configuration of a projector according to the second embodiment of the invention is the same as that of FIG. 1, illustration and detailed explanation thereof will be omitted. An image processing unit of a projector in the second embodiment is different from the image processing unit 20 in the first embodiment in configurations and operations of frequency analysis section and processing switching control section.

Figure 16:
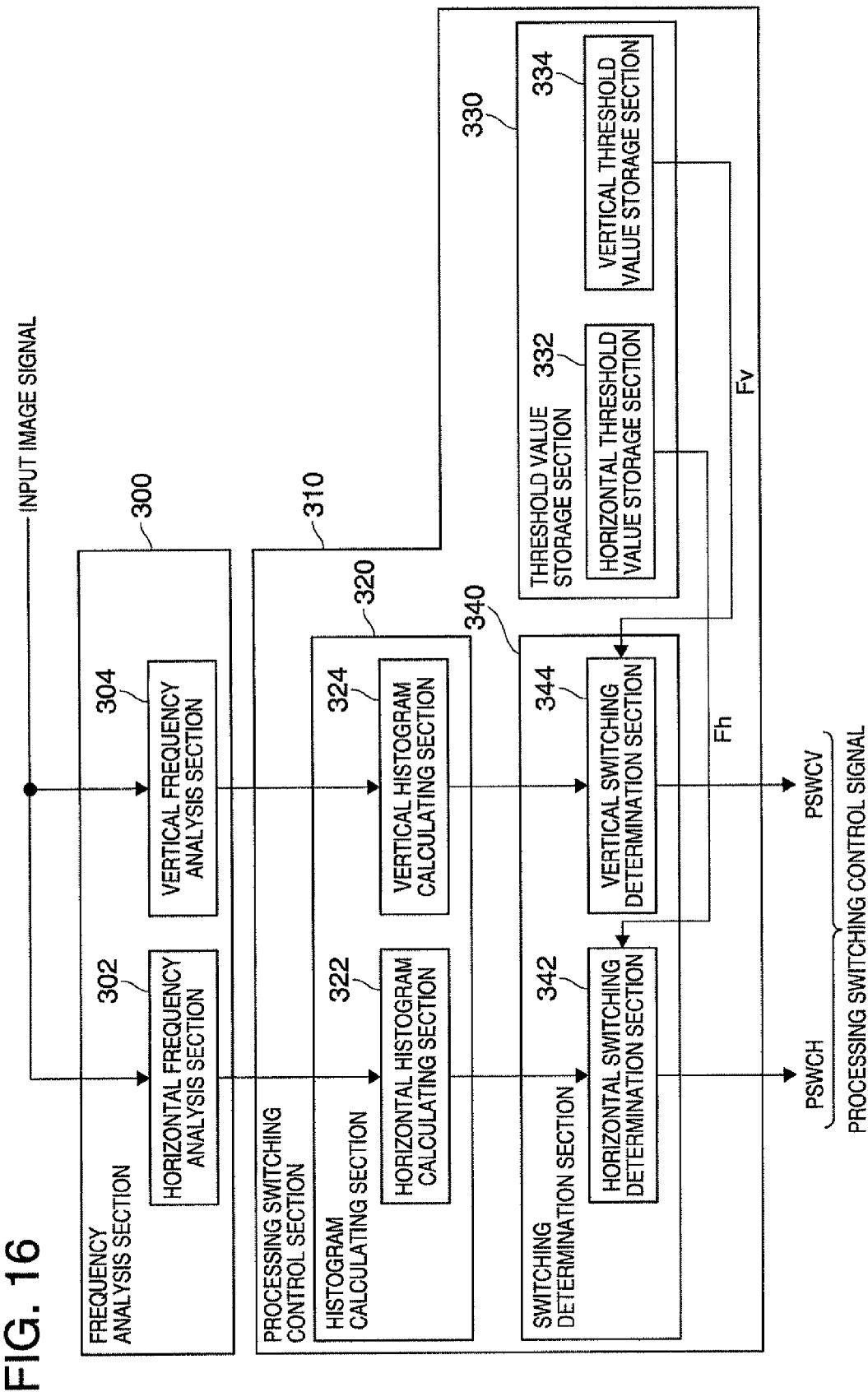
FIG. 16 is a block diagram illustrating an example of the configuration of constituent components of an image processing unit in a second embodiment of the invention.

FIG. 16 shows an example of the configuration of main constituent components of the image processing unit in the second embodiment. FIG. 16 is a block diagram illustrating examples of the configurations of frequency analysis section and processing switching control section of the image processing unit in the second embodiment. Since the other blocks which form the image processing unit in the second embodiment are the same as those of the image processing unit 20 in the first embodiment, illustration and explanation thereof will be omitted.

The image processing unit in the second embodiment includes a frequency analysis section 300 and a processing switching control section 310 in addition to the shift amount storage section 22, the shift amount calculating section 24, and the image signal correcting section 26. The frequency analysis section 300 analyzes spatial frequencies of sub-pixels aligned in the horizontal direction of an input image while analyzing spatial frequencies of sub-pixels aligned in the vertical direction of the input image. The processing switching control section 310 makes an ON/OFF control of correction processing of an image signal individually in the horizontal and vertical directions on the basis of the horizontal and vertical spatial frequencies of the input image analyzed by the frequency analysis section 300.

The frequency analysis section 300 of the image processing unit includes a horizontal frequency analysis section 302 and a vertical frequency analysis section 304. The horizontal frequency analysis section 302 analyzes spatial frequencies of sub-pixels aligned in the horizontal direction of an input image. The vertical frequency analysis section 304 analyzes spatial frequencies of sub-pixels aligned in the vertical direction of the input image.

In addition, the processing switching control section 310 includes a histogram calculating section 320, a threshold value storage section 330, and a switching determination section 340. The histogram calculating section 320 includes a horizontal histogram calculating section 322 and a vertical histogram calculating section 324. The threshold value storage section 330 includes a horizontal threshold value storage section 332 and a vertical threshold value storage section 334. The switching determination section 340 includes a horizontal switching determination section 342 and a vertical switching determination section 344.

An analysis result of the horizontal frequency analysis section 302 is supplied to the horizontal histogram calculating section 322. The horizontal histogram calculating section 322 calculates a histogram on the basis of the analysis result. On the basis of the histogram calculated by the horizontal histogram calculating section 322, the horizontal switching determination section 342 determines ON or OFF of correction processing of a horizontal image signal, which is performed by the image signal correcting section 26, with a threshold value stored in the horizontal threshold value storage section 332 as a reference. The image signal correcting section 26 makes an ON/OFF control of correction processing of a horizontal image signal on the basis of a processing switching control signal PSWCH from the horizontal switching determination section 342.

Similarly, an analysis result of the vertical frequency analysis section 304 is supplied to the vertical histogram calculating section 324. The vertical histogram calculating section 324 calculates a histogram on the basis of the analysis result. On the basis of the histogram calculated by the vertical histogram calculating section 324, the vertical switching determination section 344 determines ON or OFF of correction processing of a vertical image signal, which is performed by the image signal correcting section 26, with a threshold value stored in the horizontal threshold value storage section 334 as a reference. The image signal correcting section 26 makes an ON/OFF control of correction processing of a vertical image signal on the basis of a processing switching control signal PSWCV from the vertical switching determination section 344.

In addition, although the histogram calculating section 320 is provided in the processing switching control section 310 in the explanation of FIG. 16, the histogram calculating section 320 may be built in the frequency analysis section 300.

Figure 17A:
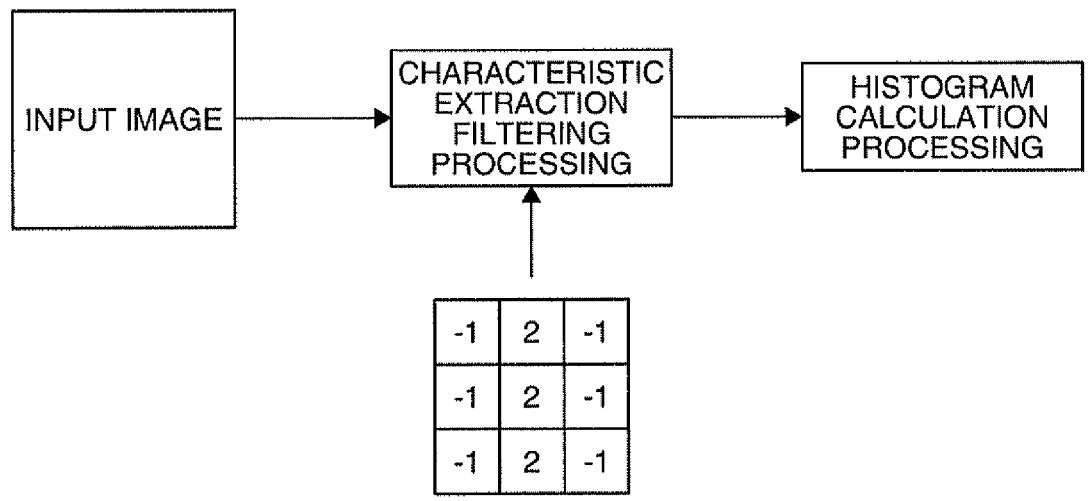
FIGS. 17A and 17B are views for explaining a processing switching control in the horizontal direction.
Figure 17B:
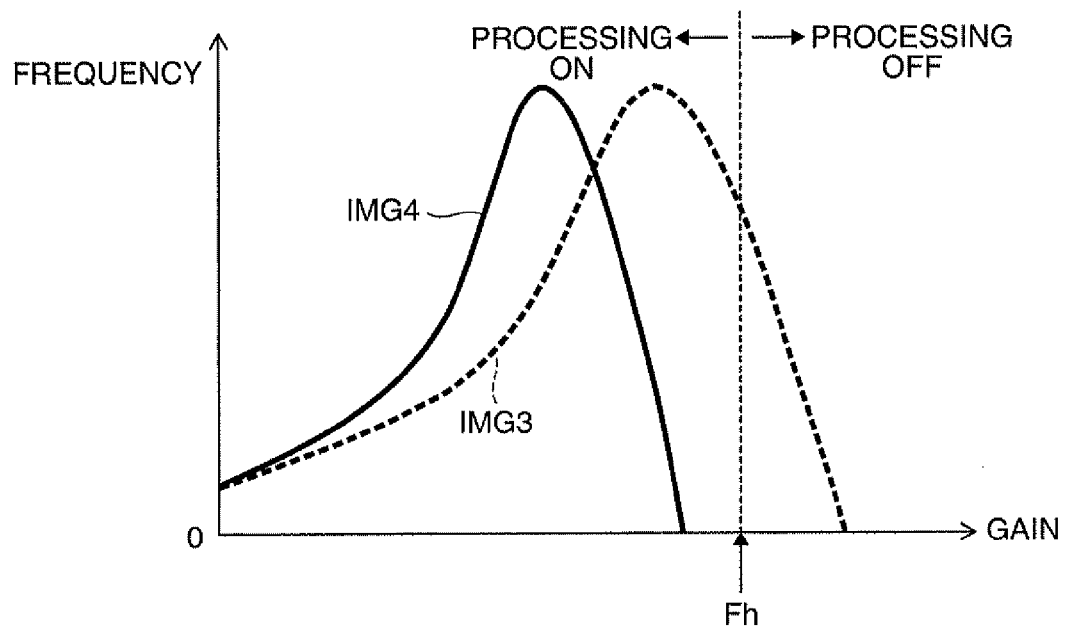

FIGS. 17A and 17B are explanatory views of a processing switching control in the horizontal direction.

FIG. 17A is a view for explaining operations of the horizontal frequency analysis section 302 and horizontal histogram calculating section 322 of FIG. 16. FIG. 17B is a view for explaining an example of an operation of the horizontal switching determination section 342 of FIG. 16.

The horizontal frequency analysis section 302 to which an input image was input analyzes a horizontal spatial frequency of the input image, for example, by characteristic extraction filtering (edge detection filtering in the horizontal direction in FIG. 17A) processing. More specifically, the horizontal frequency analysis section 302 performs a convolution operation between each sub-pixel of the input image and a matrix having filter coefficients shown in FIG. 17A. Since the operation result can be obtained by gaining, the horizontal histogram calculating section 322 can generate a histogram which shows the gain on the horizontal axis and the frequency on the vertical axis.

The histogram calculated by the horizontal histogram calculating section 322 is shown in FIG. 17B, for example. Here, a threshold value Fh is read from the horizontal threshold value storage section 332, and the horizontal switching determination section 342 determines whether or not a gain equal to or larger than the threshold value Fh is included as an analysis result of the input image. The threshold value Fh is a gain corresponding to the convolution operation result for an image which has a frequency component equal to or larger than a first threshold value in the horizontal direction. When it is determined that a gain equal to or larger than the threshold value Fh is included, the horizontal switching determination section 342 determines that a frequency component equal to or larger than the first threshold value is included in the horizontal direction of the input image and makes a control such that horizontal correction processing of the image signal correcting section 26 is turned off. On the other hand, when it is determined that a gain equal to or larger than the threshold value Fh is not included, the horizontal switching determination section 342 determines that a frequency component equal to or larger than the first threshold value is not included in the horizontal direction of the input image and makes a control such that horizontal correction processing of the image signal correcting section 26 is turned on. Thus, the processing switching control section 310 changes the correction processing in the horizontal direction, which is performed by the image signal correcting section 26, according to the frequency analysis result of the input image using the threshold value Fh as a reference.

For example, in FIG. 17B, for an input image IMG3, since a gain equal to or larger than the threshold value Fh is included, the processing switching control section 310 determines that the input image IMG3 is a high-frequency image and makes a control of turning off horizontal correction processing of the image signal correcting section 26. On the other hand, for an input image IMG4, since a gain equal to or larger than the threshold value Fh is not included, the processing switching control section 310 determines that the input image IMG4 is a low-frequency image and makes a control of turning on the horizontal correction processing of the image signal correcting section 26.

Figure 18A:
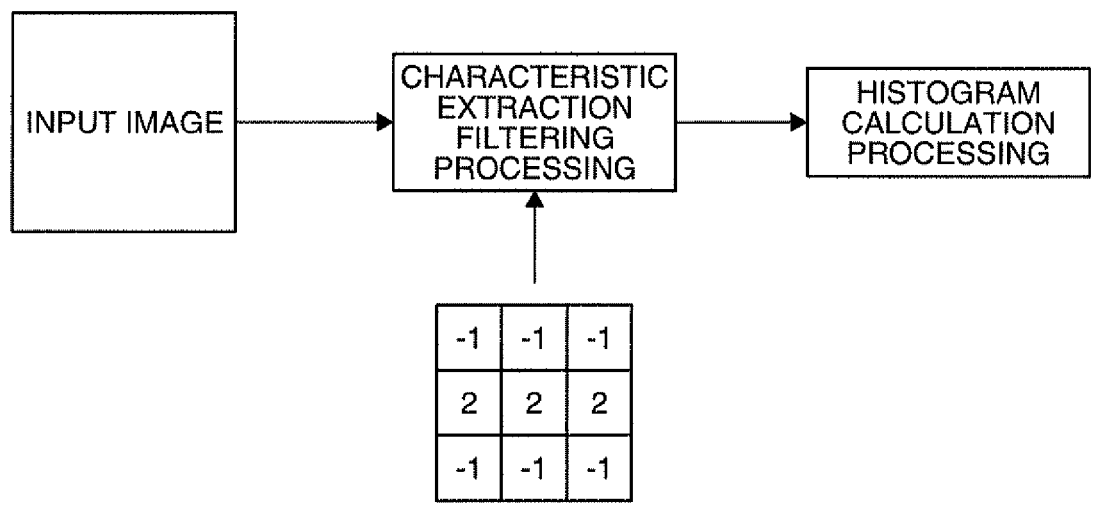
FIGS. 18A and 18B are views for explaining a processing switching control in the vertical direction.
Figure 18B:
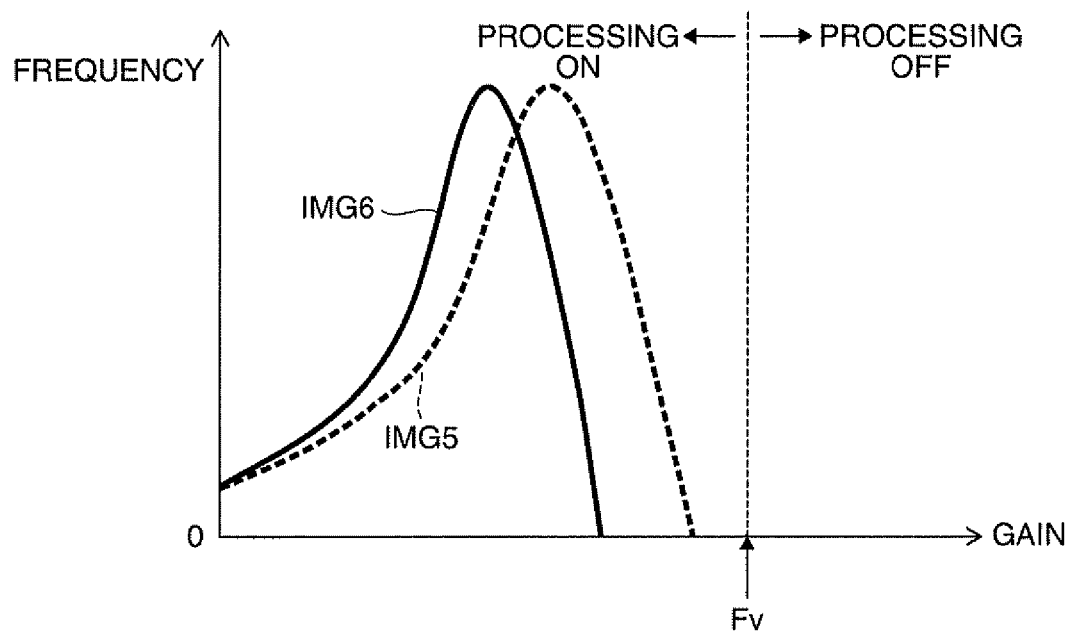

FIGS. 18A and 18B are explanatory views of a processing switching control in the vertical direction. FIG. 18A is a view for explaining operations of the vertical frequency analysis section 304 and vertical histogram calculating section 324 of FIG. 16. FIG. 18B is a view for explaining an example of an operation of the vertical switching determination section 344 of FIG. 16.

The vertical frequency analysis section 304 to which an input image was input analyzes a vertical spatial frequency of the input image, for example, by characteristic extraction filtering (edge detection filtering in the vertical direction in FIG. 18A) processing. More specifically, the vertical frequency analysis section 304 performs a convolution operation between each subpixel of the input image and a matrix having filter coefficients shown in FIG. 18A. Since the operation result can be obtained by gaining, the vertical histogram calculating section 324 can generate a histogram which shows the gain on the horizontal axis and the frequency on the vertical axis.

The histogram calculated by the vertical histogram calculating section 324 is shown in FIG. 18B, for example. Here, a threshold value Fv is read from the vertical threshold value storage section 334, and the vertical switching determination section 344 determines whether or not a gain equal to or larger than the threshold value Fv is included as an analysis result of the input image. The threshold value Fv is a gain corresponding to the convolution operation result for an image which has a frequency component equal to or larger than a second threshold value in the vertical direction. When it is determined that a gain equal to or larger than the threshold value Fv is included, the vertical switching determination section 344 determines that a frequency component equal to or larger than the second threshold value is included in the vertical direction of the input image and makes a control such that vertical correction processing of the image signal correcting section 26 is turned off. On the other hand, when it is determined that a gain equal to or larger than the threshold value Fv is not included, the vertical switching determination section 344 determines that a frequency component equal to or larger than the second threshold value is not included in the vertical direction of the input image and makes a control such that vertical correction processing of the image signal correcting section 26 is turned on. Thus, the processing switching control section 310 changes the correction processing in the vertical direction, which is performed by the image signal correcting section 26, according to the frequency analysis result of the input image using the threshold value Fv as a reference.

For example, in FIG. 18B, for input images IMG5 and IMG6, since a gain equal to or larger than the threshold value Fv is not included, the processing switching control section 310 determines that the input images IMG5 and IMG6 are low-frequency images and makes a control of turning on vertical correction processing of the image signal correcting section 26. In addition, for an input image having a gain equal to or larger than the threshold value Fv, the processing switching control section 310 makes a control of turning on vertical correction processing of the image signal correcting section 26.

FIG. 19 is a view for explaining a processing switching control signal in the second embodiment.

In the second embodiment, similar to the first embodiment, correction processing of the image signal correcting section 26 is turned off by forcibly setting all shift amounts stored in the shift amount storage section 22 or shift amounts read from the shift amount storage section 22 to 0. For example, when it is determined that the horizontal correction processing of the image signal correcting section 26 is turned off by the horizontal switching determination section 342, the shift amounts of x components stored in the shift amount storage section 22 or the shift amounts of x components read from the shift amount storage section 22 are forcibly set to 0 by a processing switching control signal PSWCH (=1). Moreover, for example, when it is determined that the vertical correction processing of the image signal correcting section 26 is turned off by the vertical switching determination section 344, the shift amounts of y components stored in the shift amount storage section 22 or the shift amounts of y components read from the shift amount storage section 22 are forcibly set to 0 by the processing switching control signal PSWCV (=1). In this way, ON/OFF control of the correction processing in each direction performed by the image signal correcting section 26 can be made individually and simply without directly controlling the image signal correcting section 26.

The function of the image processing unit which controls ON/OFF of correction processing in each direction performed by the image signal correcting section 26 in the second embodiment may be realized by hardware or may be realized by software processing.

Since the hardware configuration of the image processing unit in the second embodiment is the same as that in the first embodiment, the explanation will be omitted.

Figure 20:
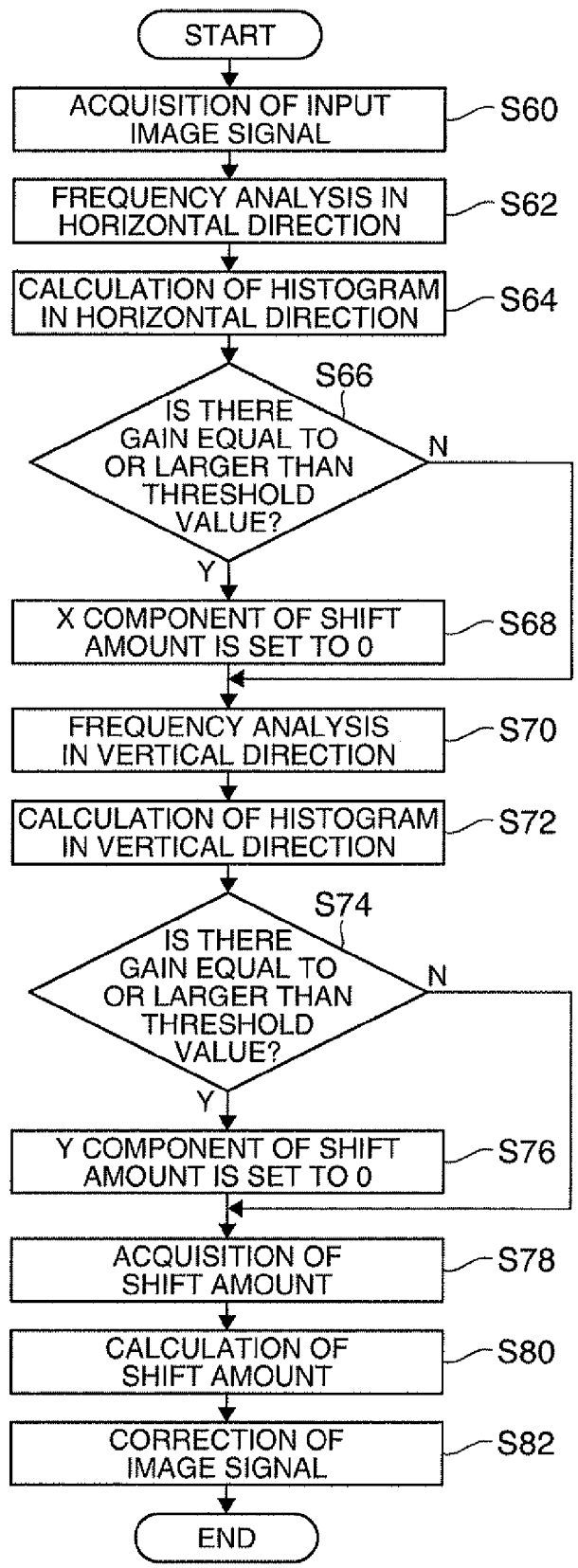
FIG. 20 is a flow chart illustrating a processing example of the image processing unit in the second embodiment.

FIG. 20 shows a flow chart of a processing example of the image processing unit in the second embodiment.

For example, a program for realizing the processing shown in FIG. 20 is stored beforehand in the ROM 82, and the CPU 80 reads the program stored in the ROM 82 and executes processing corresponding to the program. Thus, the processing shown in FIG. 20 may be realized by software processing.

First, the image processing unit in the second embodiment acquires input image signals corresponding to sub-pixels, which form each pixel of an input image, from an image signal generator (not shown) as an input image signal acquisition step (step S60).

Then, the horizontal frequency analysis section 302 of the frequency analysis section 300 of the image processing unit analyzes a horizontal spatial frequency of the input image as a horizontal frequency analysis step (step S62). Then, the horizontal histogram calculating section 322 of the processing switching control section 310 of the image processing unit calculates a histogram on the basis of the analysis result of the horizontal spatial frequency of the input image analyzed in step S62 as a horizontal histogram calculation step (step S64).

Then, the horizontal switching determination section 342 of the switching determination section 340 of the image processing unit determines whether or not a gain equal to or larger than the threshold value Fh is included (step S66).

When it is determined that a gain equal to or larger than the threshold value Fh is included (step S66: Y), the horizontal switching determination section 342 of the switching determination section 340 of the image processing unit sets x components of shift amounts stored in the shift amount storage section 22 or x components of shift amounts read from the shift amount storage section 22 to 0 (step S68).

When it is determined that a gain equal to or larger than the threshold value Fh is not included in step S66 (step S66: N) or subsequent to step S68, the vertical frequency analysis section 304 of the frequency analysis section 300 of the image processing unit analyzes a vertical spatial frequency of the input image as a vertical frequency analysis step (step S70). Then, the vertical histogram calculating section 324 of the processing switching control section 310 of the image processing unit calculates a histogram on the basis of the analysis result of the vertical spatial frequency of the input image analyzed in step S70 as a vertical histogram calculation step (step S72).

Then, the vertical switching determination section 344 of the switching determination section 340 of the image processing unit determines whether or not a gain equal to or larger than the threshold value Fv is included (step 374). When it is determined that a gain equal to or larger than the threshold value Fv is included (step S74: Y), the vertical switching determination section 344 of the switching determination section 340 of the image processing unit sets y components of shift amounts stored in the shift amount storage section 22 or y components of shift amounts read from the shift amount storage section 22 to 0 (step S76).

When it is determined that a gain equal to or larger than the threshold value Fv is not included in step S74 (step S74: N) or subsequent to step S76, the shift amount calculating section 24 of the image processing unit acquires the shift amounts from the shift amount storage section 22 or the shift amounts, of which either x direction or y direction are set to 0, as a shift amount acquisition step (step S78). Then, the shift amount calculating section 24 of the image processing unit calculates shift amounts of all sub-pixels of R and B components of the display image on the basis of the shift amounts acquired in step S78, as described in FIGS. 7 and 8, as a shift amount calculation step (step S80).

Then, the image signal correcting section 26 of the image processing unit corrects an image signal of the sub-pixel position on the basis of the shift amounts, which were calculated in step S80, for every sub-pixel as described in FIG. 9 as an image signal correction step (step S82), completing the series of processing (End). In the image signal correction step, an image signal is interpolated according to the shift amount when the image signal is corrected using the shift amount other than 0. However, even if an image signal is corrected as shown in FIG. 9 using the shift amount set to 0, the correction processing is substantially turned off. This means that ON/OFF of correction processing can be controlled individually for each direction even if correction processing of an image signal is performed without exception.

The image signal corrected by the image processing unit as described above is input to the projection unit 100. The projection unit 100 displays an image by projecting light, which is modulated on the basis of the image signal corrected by the image processing unit, onto the screen SCR as an image display step.

Since steps S80 and S82 of FIG. 20 are the same as those of FIG. 15, the explanation will be omitted. In addition, although frequency analysis in the vertical direction is started after performing frequency analysis in the horizontal direction and histogram calculation in the explanation of FIG. 20, the invention is not limited thereto. For example, the frequency analysis in the horizontal direction may be started after performing the frequency analysis in the vertical direction and the histogram calculation. Prior to the image signal correcting step of step S82, it is preferable that the shift amount be set to 0 in at least one direction of the x and y directions in the case of an image signal of a high-frequency image.

As described above, according to the second embodiment, even if display sub-pixels which form a display pixel are shifted from each other, generation of a false color in an endmost portion or near the edge of the display image or deterioration of a sense of resolution can be suppressed. In addition, since correction processing of an image signal is made to change, individually for each direction, according to the analysis result of horizontal and vertical spatial frequencies of an input image, it is possible to suppress moiré generated on the display image when correction processing is performed on a high-frequency image, for example.

Third Embodiment

In the first and second embodiments, when an input image is a high-frequency image, correction processing of the whole input image is controlled to be turned off. However, the invention is not limited thereto. In a third embodiment of the invention, a frequency is analyzed for each of a plurality of division images obtained by dividing an input image and different correction processing is performed on each division image according to the analysis result.

Hereinafter, an example in which an input image is divided into four parts will be described. However, the invention is not limited to the number of divided parts of the input image.

The configuration of a projector according to the third embodiment of the invention is the same as that of FIG. 1. However, in the third embodiment, a plurality of shift amounts within a display region of each of division images obtained by dividing an input image are stored in a shift amount storage section. In addition, a frequency analysis section analyzes a frequency for every division image, and a processing switching control section controls ON/OFF of correction processing of an image signal correcting section for every division image.

Figure 21A:
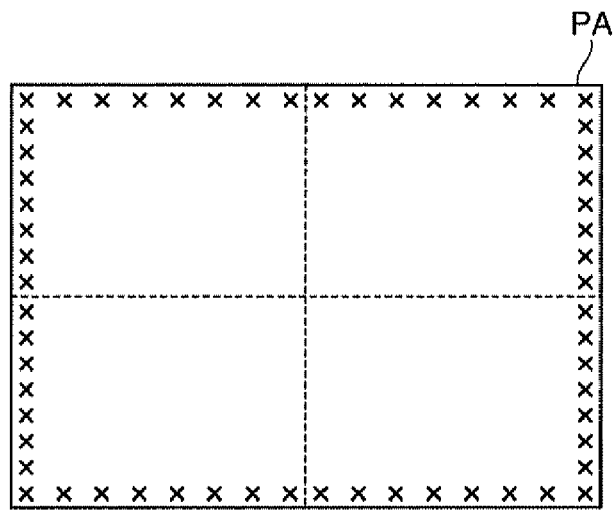
FIGS. 21A and 21B are views for explaining the shift amount in a third embodiment.
Figure 21B:
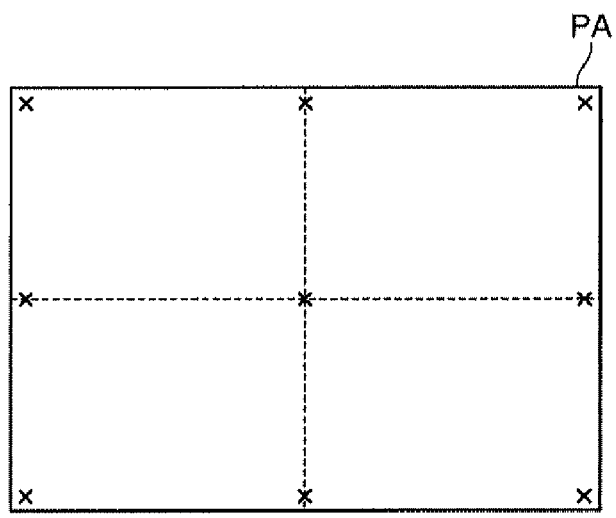

FIGS. 21A and 21B are views for explaining the shift amount in the third embodiment. FIG. 21A shows an example of the shift amount stored in the shift amount storage section. FIG. 21B shows another example of the shift amount stored in the shift amount storage section.

In the shift amount storage section of the third embodiment, for example, '16×2' shift amounts are stored along the horizontal edge of a display image of the projected area PA and '16×2' shift amounts are stored along the vertical edge of the display image of the projected area PA as shown in FIG. 21A. Therefore, for each of division images obtained by dividing the display image of the projected area PA into four parts, a plurality of shift amounts are stored in the shift amount storage section. Therefore, the shift amounts of display positions of display sub-pixels corresponding to sub-pixels which form each pixel of each division image can be calculated on the basis of the plurality of shift amounts stored in the shift amount storage section.

Moreover, for example, as shown in FIG. 21B, nine shift amounts of four corners of the display image of the projected area PA, middle portions of the sides, and a central portion may be stored in the shift amount storage section 22 in the third embodiment. Also in this case, for each of the division images obtained by dividing the display image of the projected area PA into four parts, a plurality of shift amounts are substantially stored in the shift amount storage section. Therefore, the shift amounts of display positions of display sub-pixels corresponding to sub-pixels which form each pixel of each division image can be calculated on the basis of the plurality of shift amounts stored in the shift amount storage section.

Figure 22:
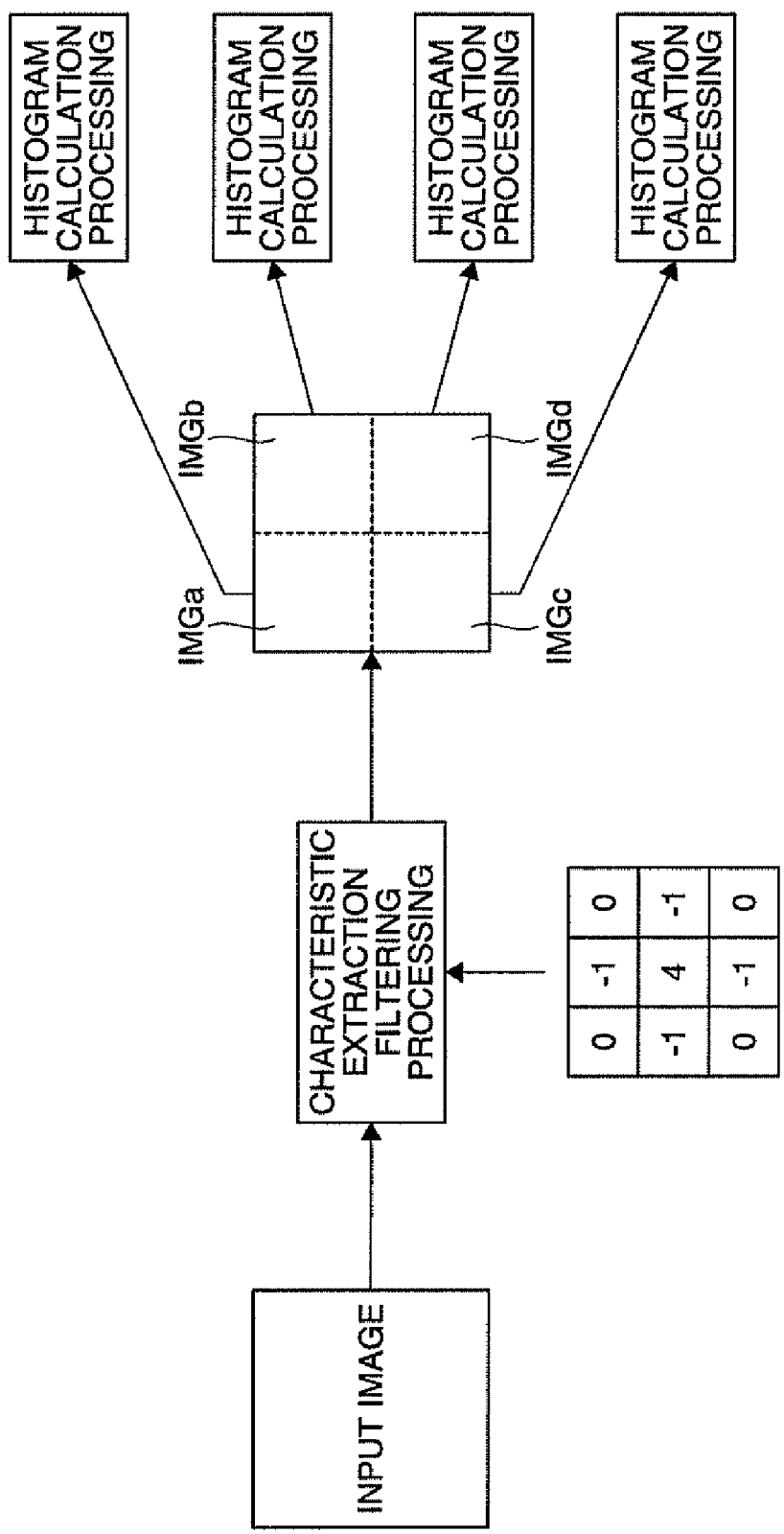
FIG. 22 is a view for explaining an operation of a frequency analysis section in the third embodiment.

FIG. 22 is a view for explaining an operation of the frequency analysis section in the third embodiment. In addition, FIG. 22 is a view for explaining an operation of a histogram calculating section which calculates a histogram using an analysis result of the frequency analysis section.

Figure 23A:
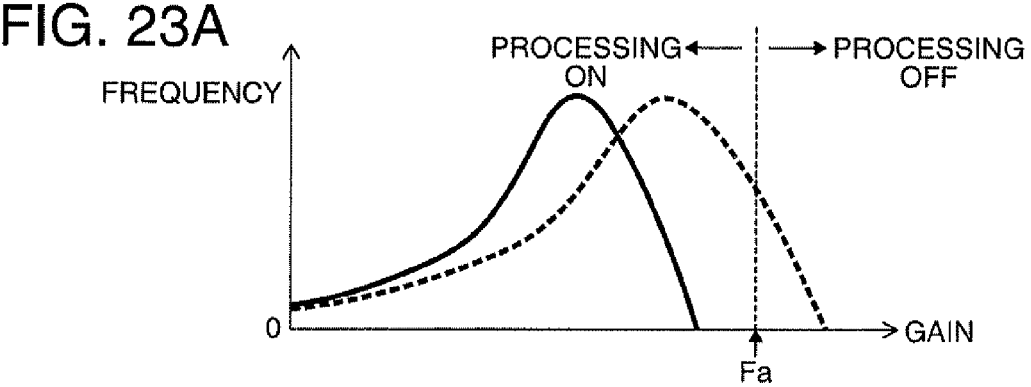
FIGS. 23A to 23D are views for explaining an operation of a processing switching control section in the third embodiment.
Figure 23B:
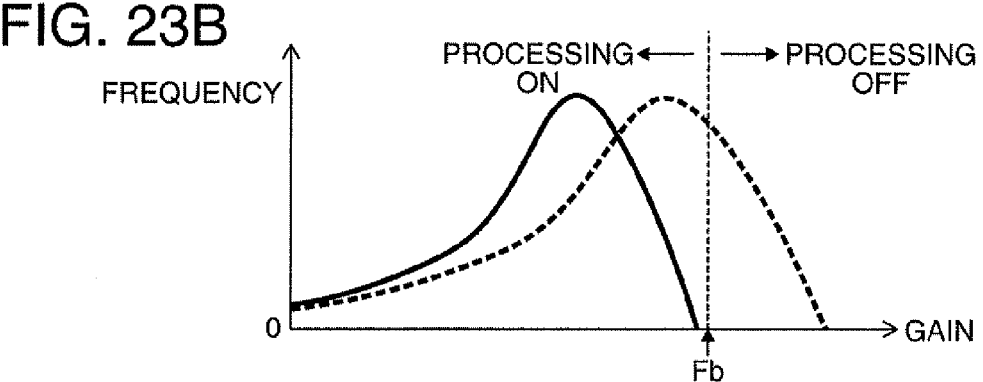
Figure 23C:
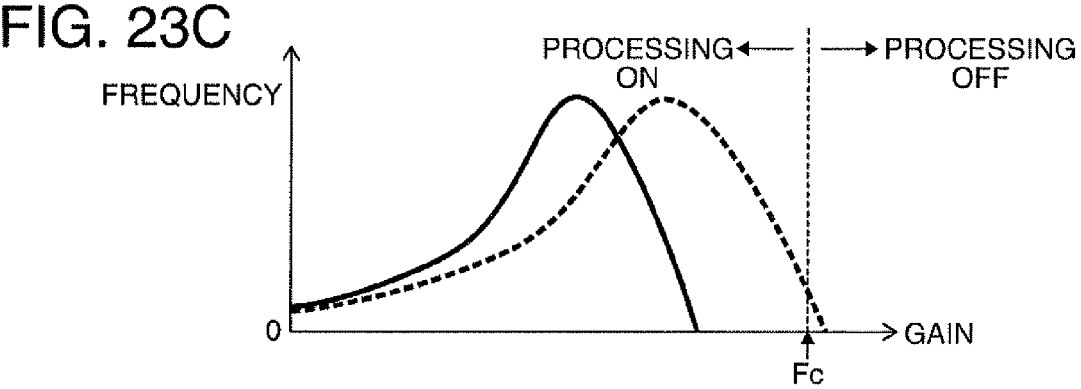
Figure 23D:
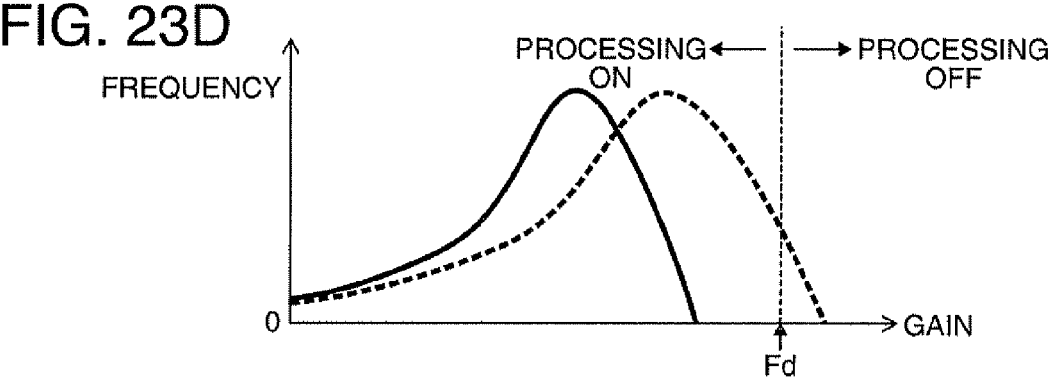

FIGS. 23A to 23D are views for explaining an operation of a processing switching control section in the third embodiment. FIG. 23A is a view for explaining an operation of the processing switching control section for a first division image IMGa of division images obtained by dividing an input image into four parts. FIG. 23B is a view for explaining an operation of the processing switching control section for a second division image IMGb of the division images obtained by dividing the input image into four parts. FIG. 23C is a view for explaining an operation of the processing switching control section for a third division image IMGc of the division images obtained by dividing the input image into four parts. FIG. 23D is a view for explaining an operation of the processing switching control section for a fourth division image IMGd of the division images obtained by dividing the input image into four parts.

The frequency analysis section to which an input image was input analyzes a spatial frequency of the input image for each of the division images obtained by dividing the input image into four parts, for exampler by characteristic extraction filtering (edge detection filtering in FIG. 22) processing. More specifically, the frequency analysis section performs a convolution operation between each sub-pixel of each division image and a matrix having filter coefficients shown in FIG. 22, for every division image. Since the operation result can be obtained by gaining, the histogram calculating section of the processing switching control section can generate a histogram, which shows the gain on the horizontal axis and the frequency on the vertical axis, for every division image.

Histograms calculated by the histogram calculating section are shown in FIGS. 23A to 23D, for example. Here, for the first division image INGa, a threshold value Fa is read from the threshold value storage section and the switching determination section determines whether or not a gain equal to or larger than the threshold value Fa is included. The threshold value Fa is a gain corresponding to the convolution operation result for an image which has a frequency component equal to or larger than a predetermined third threshold value. When it is determined that a gain equal to or larger than the threshold value Fa is included, the switching determination section determines that the first division image IMGa has a high-frequency image and makes a control such that correction processing on the first division image INGa performed by the image signal correcting section 26 is turned off. On the other hand, when it is determined that a gain equal to or larger than the threshold value Fa is not included, the switching determination section determines that the first division image IMGa does not have a high-frequency image and makes a control such that correction processing on the first division image IMGa performed by the image signal correcting section 26 is turned on. Thus, the processing switching control section changes correction processing on the first division image IMGa, which is performed by the image signal correcting section 26, according to the frequency analysis result of the first division image IMGa using the threshold value Fa as a reference.

Similarly, for the second division image IMGb, a threshold value Fb (gain corresponding to the convolution operation result for an image which has a frequency component equal to or larger than a predetermined fourth threshold value) is read from the threshold value storage section and the processing switching control section changes correction processing on the second division image IMGb, which is performed by the image signal correcting section 26, according to the frequency analysis result of the second division image IMGb using the threshold value Fb as a reference. In addition, for the third division image IMGc, a threshold value Fc (gain corresponding to the convolution operation result for an image which has a frequency component equal to or larger than a predetermined fifth threshold value) is read from the threshold value storage section and the processing switching control section changes correction processing on the third division image IMGc, which is performed by the image signal correcting section 26, according to the frequency analysis result of the third division image IMGc using the threshold value Fc as a reference. In addition, for the fourth division image IMGd, a threshold value Fd (gain corresponding to the convolution operation result for an image which has a frequency component equal to or larger than a predetermined sixth threshold value) is read from the threshold value storage section and the processing switching control section changes correction processing on the fourth division image IMGd, which is performed by the image signal correcting section 26, according to the frequency analysis result of the fourth division image IMGd using the threshold value Fd as a reference.

The function of the image processing unit which controls ON/OFF of correction processing on each division image performed by the image signal correcting section 26 in the third embodiment may be realized by hardware or may be realized by software processing.

Since the hardware configuration of the image processing unit in the third embodiment is the same as that in the first embodiment, the explanation will be omitted.

Figure 24:
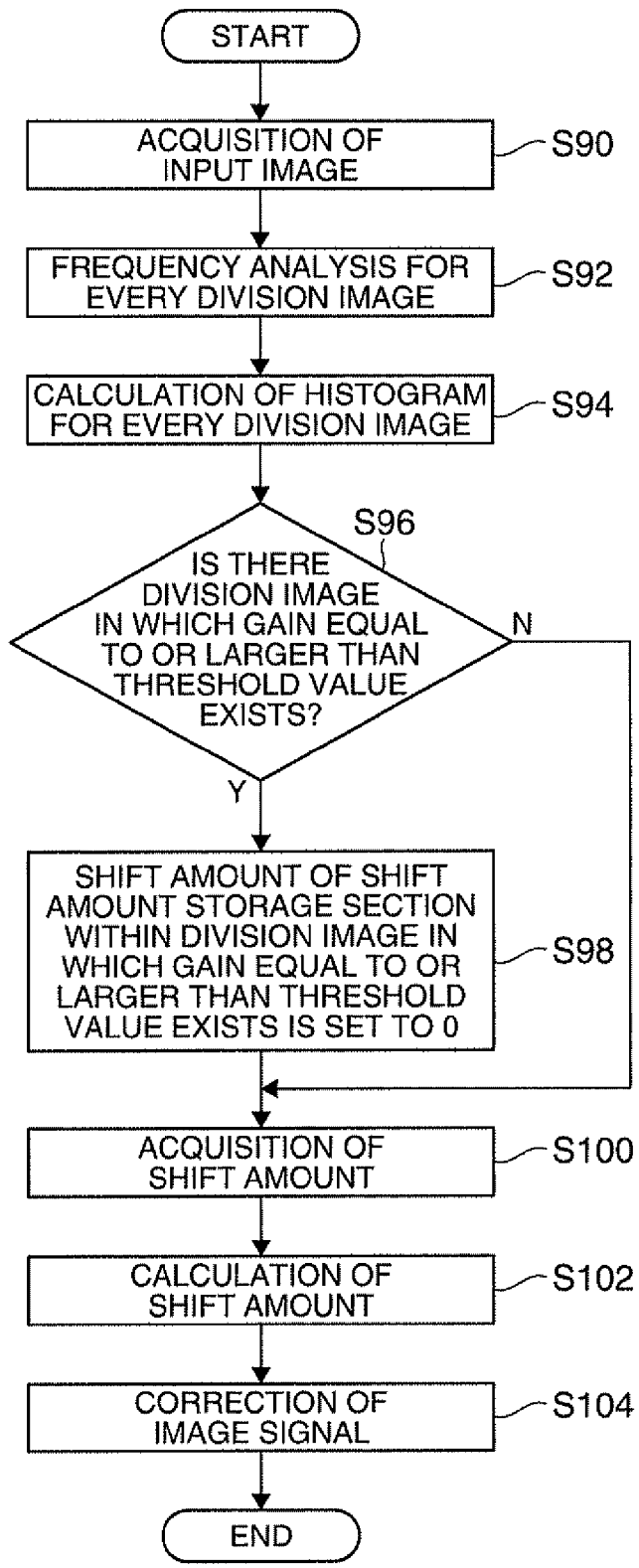
FIG. 24 is a flow chart illustrating a processing example of an image processing unit in the third embodiment.

FIG. 24 shows a flow chart of a processing example of the image processing unit in the third embodiment.

For example, a program for realizing the processing shown in FIG. 24 is stored beforehand in the ROM 82, and the CPU 80 reads the program stored in the ROM 82 and executes processing corresponding to the program. Thus, the processing shown in FIG. 24 may be realized by software processing.

First, the image processing unit in the third embodiment acquires input image signals corresponding to sub-pixels, which form each pixel of an input image, from an image signal generator (not shown) as an input image signal acquisition step (step S90).

Then, the frequency analysis section of the image processing unit analyzes a spatial frequency for every division image obtained by dividing the input image as a frequency analysis step (step S92). Then, the histogram calculating section of the processing switching control section of the image processing unit calculates a histogram on the basis of the analysis result of the spatial frequency of each division image analyzed in step S92 as a histogram calculation step (step S94).

Then, the switching determination section of the image processing unit determines whether or not a gain equal to or larger than the threshold value corresponding to each division image is included (step S96). When it is determined that there is a division image having a gain equal to or larger than the threshold value (step S96: Y), the switching determination section of the image processing unit sets shift amounts, which are stored in the shift amount storage section 22, within the division image having a gain equal to or larger than the threshold value or shift amounts read from the shift amount storage section 22 to 0 (step S98).

When it is determined that there is no division image having a gain equal to or larger than the threshold value in step S96 (step S96: N), or subsequent to step S98, the shift amount calculating section 24 of the image processing unit acquires the shift amounts from the shift amount storage section 22 or the shift amounts set to 0 as a shift amount acquisition step (step S100). Then, the shift amount calculating section 24 of the image processing unit calculates shift amounts of all sub-pixels of R and B components of the display image on the basis of the shift amounts acquired in step S100, as described in FIGS. 7 and 8, as a shift amount calculation step (step S102).

Then, the image signal correcting section 26 of the image processing unit corrects an image signal of the sub-pixel position on the basis of the shift amounts, which were calculated in step S102, for every sub-pixel as described in FIG. 9 as an image signal correction step (step S104), completing the series of processing (End). In the image signal correction step, an image signal is interpolated according to the shift amount when the image signal is corrected using the shift amount other than 0. However, even if an image signal is corrected as shown in FIG. 9 using the shift amount set to 0, the correction processing is substantially turned off. This means that ON/OFF of correction processing can be controlled for every division image even if correction processing of an image signal is performed without exception.

The image signal corrected by the image processing unit as described above is input to the projection unit 100. The projection unit 100 displays an image by projecting light, which is modulated on the basis of the image signal corrected by the image processing unit, onto the screen SCR as an image display step.

Since steps S102 and S104 of FIG. 24 are the same as those of FIG. 15, the explanation will be omitted.

In addition, although a determination on whether or not each division image is a high-frequency image is made using different threshold values for every division image in the third embodiment, it may be determined whether or not each division image is a high-frequency image using a common threshold value as a reference.

As described above, in the third embodiment, correction processing of an image signal of each division image is made to change individually according to the analysis result of a spatial frequency of each of the division images obtained by dividing an input image. That is, correction processing based on the shift amounts is omitted for image signals corresponding to sub-pixels which form each pixel within a division image having a frequency component equal to or larger than the predetermined threshold value, while correction processing based on the shift amounts is performed for image signals corresponding to sub-pixels which form each pixel within a division image which does not have a frequency component equal to or larger than the threshold value. Thus, according to the third embodiment, generation of a false color in an endmost portion or near the edge or deterioration of a sense of resolution can be suppressed in the other division images by making a control of suppressing a moiré only for a division image in which the moiré may be generated.

Fourth Embodiment

Although the shift amount is forcibly set to 0 when correction processing of the image signal correcting section is turned off in the first to third embodiments, the invention is not limited thereto. In a fourth embodiment of the invention, ON/OFF control of correction processing of an image signal correcting section is made by performing an enable control of processing directly on the image signal correcting section.

Figure 25:
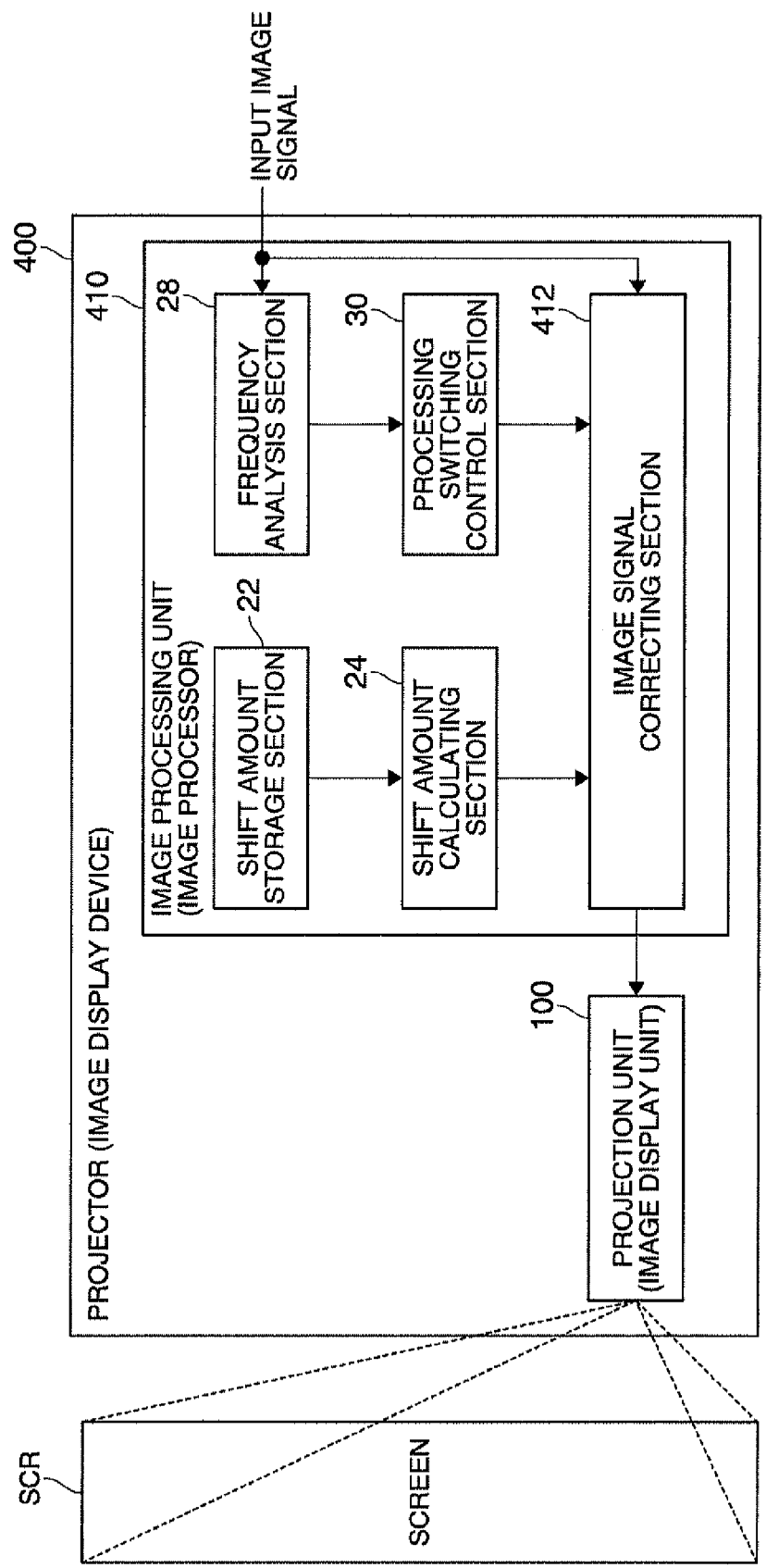
FIG. 25 is a block diagram illustrating an example of the configuration of a projector as an image display device according to a fourth embodiment of the invention.

FIG. 25 is a block diagram illustrating an example of the configuration of a projector as an image display device according to the fourth embodiment of the invention. In FIG. 25, the same portions as in FIG. 1 are denoted by the same reference numerals, and the explanation will be appropriately omitted.

A projector 400 according to the fourth embodiment includes an image processing unit 410 and a projection unit 100. The image processing unit 410 in the fourth embodiment is different from the image processing unit 20 in the first embodiment in that correction processing of an image signal correcting section can be directly turned on and off by a processing switching control signal from the processing switching control section 30. For this reason, an image signal correcting section 412 included in the image processing unit 410 may set the shift amount from the shift amount calculating section 24 to 0 when correction processing is turned off by a processing switching control signal, or correction processing of the image signal correcting section 412 may be skipped by the processing switching control signal. Hereinbelow, it is assumed that correction processing of the image signal correcting section 412 is turned off by skipping correction processing of the image signal correcting section 412 by the processing switching control signal.

The function of the image processing unit 410 which controls ON/OFF of correction processing of the image signal correcting section 412 in the fourth embodiment may be realized by hardware or may be realized by software processing. Since the hardware configuration of the image processing unit in the fourth embodiment is the same as that in the first embodiment, the explanation will be omitted.

Figure 26:
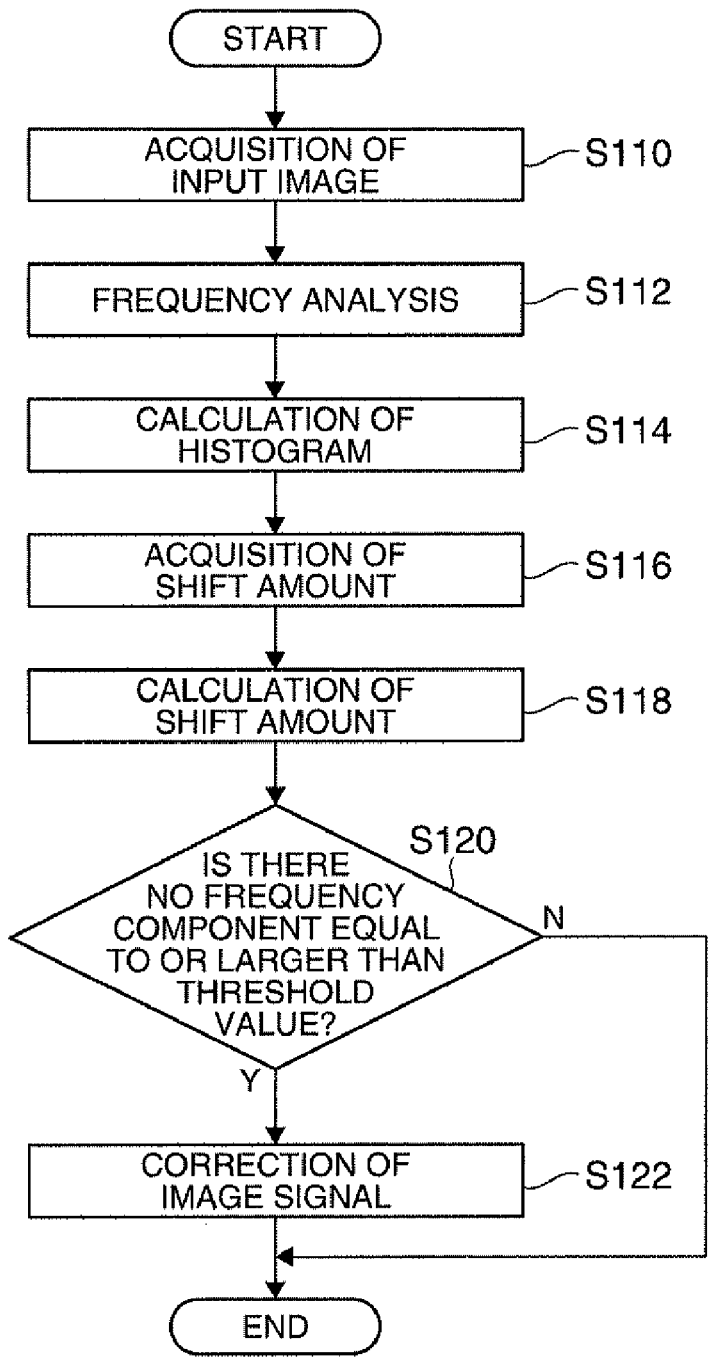
FIG. 26 is a flow chart illustrating a processing example of an image processing unit in the fourth embodiment.

FIG. 26 is a flow chart illustrating a processing example of the image processing unit 410 in the fourth embodiment.

For example, a program for realizing the processing shown in FIG. 26 is stored beforehand in the ROM 82, and the CPU 80 reads the program stored in the ROM 82 and executes processing corresponding to the program. Thus, the processing shown in FIG. 26 may be realized by software processing.

First, the image processing unit 410 in the fourth embodiment acquires input image signals corresponding to subpixels, which form each pixel of an input image, from an image signal generator (not shown) as an input image signal acquisition step (step S110).

Then, the frequency analysis section 28 of the image processing unit 410 analyzes a spatial frequency of the input image as a frequency analysis step (step S112). Then, the histogram calculating section of the processing switching control section of the image processing unit 410 calculates a histogram on the basis of the analysis result of the spatial frequency of the input image analyzed in step S112 as a histogram calculation step (step S114).

Then, the shift amount calculating section 24 of the image processing unit 410 acquires the shift amounts from the shift amount storage section 22 as a shift amount acquisition step (step S116). Then, the shift amount calculating section 24 of the image processing unit 410 calculates shift amounts of all sub-pixels of R and B components of the display image on the basis of the shift amounts acquired in step S116, as described in FIGS. 7 and 8, as a shift amount calculation step (step S18).

Then, the processing switching control section 30 of the image processing unit 410 determines whether or not a frequency component equal to or larger than a threshold value is included (step S120). When it is determined that a frequency component equal to or larger than a threshold value is not included (step S120: Y), the input image is determined to be a low-frequency image. Then, the image signal correcting section 412 of the image processing unit 410 performs correction processing of an image signal of the input image on the basis of the shift amount calculated in step S118 (step S122), completing the series of processing (End).

On the other hand, when it is determined that a frequency component equal to or larger than the threshold value is included in step S120 (step S120: N), the input image is determined to be a high-frequency image. In this case, a control of skipping correction processing of the image signal correcting section 412 is performed so that the correction processing is omitted, completing the series of processing (End).

As described above, according to the fourth embodiment, similar to the above embodiments, even if display sub-pixels which form a display pixel are shifted from each other, generation of a false color in an endmost portion or near the edge of the display image or deterioration of a sense of resolution can be suppressed. Furthermore, according to the fourth embodiment, ON/OFF control of the correction processing of the image signal correcting section 412 can be made very simply.

As described above, according to the first to fourth embodiments, by changing correction processing of an image signal according to the spatial frequency of an input image when the display positions of display sub-pixels are shifted from each other, it is possible to display an image in which generation of a false color in an endmost portion or near the edge of the display image or deterioration of a sense of resolution is suppressed while suppressing generation of a moiré. By adopting such embodiments, for example, in the case of continuously supplying input images such that the spatial frequency gradually increases, correction processing of the image signal is changed when displaying an input image having a spatial frequency near the threshold value. As a result, the image seems to be shifted.

Having described the image processor, the image display device, the image processing method, the image display method, and the program according to the embodiments of the invention, the invention is not limited to the above-described embodiments, but various modifications may be made within the scope without departing from the subject matter or spirit of the invention. For example, the following modifications may also be made.

(1) In each of the embodiments described above, the spatial frequency of an input image was analyzed by performing two-dimensional DFT processing and edge detection processing. However, the invention is not limited to the method of analyzing a frequency of an image. For example, it may be determined whether or not an input image has a frequency component equal to or larger than a threshold value.

(2) In each of the embodiments described above, different correction processing was performed independently in the horizontal and vertical directions, or different correction processing was performed independently for every division image obtained by dividing an input image. However, the invention is not limited thereto. For example, for every division image obtained by dividing an input image, different correction processing may be performed independently in the horizontal and vertical directions. Alternatively, for example, different correction processing may be performed independently in the horizontal and vertical directions for a certain division image and different correction processing may be performed simultaneously in the horizontal and vertical directions for another division image.

(3) In each of the embodiments described above, the shift amount storage section stored shift amounts of a plurality of sub-pixels sampled as representative points among all pixels within a display image and the shift amount calculating section calculated the shift amount of an arbitrary sub-pixel. However, the invention is not limited thereto. For example, the shift amount storage section may store shift amounts of sub-pixels of one whole screen and the shift amount calculating section may be omitted.

(4) In each of the embodiments described above, the shift amount of the display position of the R-component display sub-pixel and the shift amount of the display position of the B-component display sub-pixel were stored using the display position of the C-component display sub-pixel as a reference position. However, the invention is not limited thereto. For example, the shift amount of the display position of the G-component display sub-pixel and the shift amount of the display position of the B-component display sub-pixel may be stored using the display position of the R-component display sub-pixel as a reference position. Alternatively, the shift amount of the display position of the R-component display sub-pixel and the shift amount of the display position of the G-component display sub-pixel may be stored using the display position of the B-component display sub-pixel as a reference position.

(5) In each of the embodiments described above, one pixel was formed by sub-pixels of three color components. However, the invention is not limited thereto. The number of color components which form one pixel may be 2 or 4 or more.

(6) In each of the embodiments described above, the display position of one display sub-pixel among display sub-pixels which form each display pixel was set as the reference position. However, the invention is not limited thereto. For example, a predetermined position of a screen coordinate system or a predetermined position of a panel coordinate system of each liquid crystal panel may be set as the reference position.

(7) In each of the embodiments described above, a light valve was used as the light modulation element. However, the invention is not limited thereto. For example, a DLP (digital light processing; registered trademark), a LCOS (liquid crystal on silicon), and the like may be adopted as light modulation elements.

(8) In each of the embodiments described above, a light valve using a so-called three plate type transmissive liquid crystal panel was explained as an example of a light modulation element. However, a light valve using a four or more plate type transmissive liquid crystal panel may also be adopted.

(9) In each of the embodiments described above, a bilinear method, a nearest-neighbor method, a bicubic method, and an area gradation method were mentioned as examples of interpolation processing method of shift amounts of all sub-pixels or correction processing method of an image signal. However, the invention is not limited to such processing methods.

(10) In each of the embodiments described above, the invention was described as the image processor, the image display device, the image processing method, the image display method, and the program. However, the invention is not limited thereto. For example, the invention may be a recording medium recorded with a program in which the procedure of an image display method for realizing the invention is described.

The entire disclosure of Japanese Patent Application No. 2008-201563, filed Aug. 5, 2009 is expressly incorporated by reference herein.

What is claimed is:

1. An image processor that corrects image signals corresponding to sub-pixels which form one pixel, comprising:
a shift amount storage section that stores shift amounts of display positions of display sub-pixels corresponding to the sub-pixels which form a display pixel with respect to a predetermined reference position within a display image;

a frequency analysis section that analyzes a spatial frequency of an input image and outputs an analysis result; and an image signal correcting section that corrects image signals corresponding to the sub-pixels, which form each pixel of the input image, on the basis of the analysis result and the shift amounts, wherein the image signal correcting section performs different correction processing according to the spatial frequency, and the image signal correcting section omits the correction processing when the input image has a frequency component equal to or larger than a predetermined threshold value and performs the correction processing when the input image does not have a frequency component equal to or larger than the predetermined threshold value.

2. The image processor according to claim 1,
wherein the image signal correcting section changes the correcting processing by changing the shift amount from the shift amount storage section on the basis of the analysis result of the frequency analysis section.

3. The image processor according to claim 1,
wherein the frequency analysis section includes a horizontal frequency analysis section that analyzes a horizontal spatial frequency of the input image, and
the image signal correcting section omits correction processing of image signals corresponding to sub-pixels aligned in a horizontal direction of the input image when a frequency component equal to or larger than a first threshold value in the horizontal direction of the input image is included and performs correction processing of image signals corresponding to sub-pixels aligned in a horizontal direction of the input image when a frequency component equal to or larger than the first threshold value in the horizontal direction of the input image is not included.

4. The image processor according to claim 1,
wherein the frequency analysis section includes a vertical frequency analysis section that analyzes a vertical spatial frequency of the input image, and
the image signal correcting section omits correction processing of image signals corresponding to sub-pixels aligned in a vertical direction of the input image when a frequency component equal to or larger than a second threshold value in the vertical direction of the input image is included and performs correction processing of image signals corresponding to sub-pixels aligned in a vertical direction of the input image when a frequency component equal to or larger than the second threshold value in the vertical direction of the input image is not included.

5. The image processor according to claim 1,
wherein on condition that a frequency component equal to or larger than a predetermined threshold value is included in at least some of sub-pixels of a first color component which form each pixel of the input image, the image signal correcting section omits the correction processing for all sub-pixels of the first color component.

6. The image processor according to claim 1,
wherein the frequency analysis section analyzes a spatial frequency of each of a plurality of division images obtained by dividing the input image, and the image signal correcting section omits correction processing based on the shift amount for image signals corresponding to sub-pixels which form each pixel within a division image having a frequency component equal to or larger than a predetermined threshold value and performs correction processing based on the shift amount for image signals corresponding to sub-pixels which form each pixel within a division image not having a frequency component equal to or larger than the threshold value.

7. The image processor according to claim 1, further comprising:
a shift amount calculating section that calculates a shift amount at a corresponding sub-pixel position on the basis of the shift amounts stored in the shift amount storage section,
wherein the image signal correcting section corrects an image signal corresponding to the sub-pixel position on the basis of the shift amount calculated by the shift amount calculating section.

8. An image display device that performs image display on the basis of image signals corresponding to sub-pixels which form one pixel, comprising:
the image processor according to claim 1; and
an image display section that displays an image on the basis of image signals corresponding to the sub-pixels corrected by the image processor.

9. An image display device that performs image display on the basis of image signals corresponding to sub-pixels which form one pixel, comprising:
an image signal correcting section that corrects the image signals corresponding to the sub-pixels, on the basis of shift amounts of display sub-pixels corresponding to the sub-pixels which form a display pixel, according to a spatial frequency of an input image; and
an image display section that displays an image on the basis of image signals of the sub-pixels corrected by the image signal correcting section,
wherein the image display section displays an image in which generation of a Moiré is suppressed regardless of the spatial frequency, and
the image signal correcting section omits the correction processing when the input image has a frequency component equal to or larger than a predetermined threshold value and performs the correction processing when the input image does not have a frequency component equal to or larger than the predetermined threshold value.

10. An image processing method of correcting image signals corresponding to sub-pixels which form one pixel, comprising:
acquiring an image signal corresponding to an input image;
correcting image signals corresponding to the sub-pixels, which form each pixel of the input image, on the basis of shift amounts of display positions of display sub-pixels corresponding to the sub-pixels which form a display pixel; and
analyzing a spatial frequency of the input image,
wherein in correcting image signals, different correction processing is performed according to the spatial frequency, and
in correcting image signals, the correction processing is omitted when the input image has a frequency component equal to or larger than a predetermined threshold value and the correction processing is performed when the input image does not have a frequency component equal to or larger than the predetermined threshold value.

11. The image processing method according to claim 10, wherein the correction processing in the correcting image signals is changed by changing the shift amount on the basis of an analysis result in the analyzing of the spatial frequency.

12. An image display method of performing image display on the basis of image signals corresponding to sub-pixels which form one pixel, comprising:

acquiring an image signal corresponding to an input image;

correcting image signals corresponding to the sub-pixels on the basis of shift amounts of display positions of display sub-pixels, which correspond to the sub-pixels which form a display pixel, according to a spatial frequency of the input image; and displaying an image on the basis of image signals of the sub-pixels corrected in the correcting of image signals, wherein in the displaying of an image, an image in which generation of a Moiré is suppressed regardless of the spatial frequency is displayed, and in correcting image signals, the correction processing is omitted when the input image has a frequency component equal to or larger than a predetermined threshold value and the correction processing is performed when the input image does not have a frequency component equal to or larger than the predetermined threshold value.

* * * * *